US007065530B2

(12) United States Patent
Chan et al.

(10) Patent No.: US 7,065,530 B2
(45) Date of Patent: Jun. 20, 2006

(54) DATA STRUCTURE FOR EFFICIENT ACCESS TO VARIABLE-SIZE DATA OBJECTS

(75) Inventors: Shing-Chow Chan, Hong Kong (HK); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 528 days.

(21) Appl. No.: 10/285,138

(22) Filed: Oct. 30, 2002

(65) Prior Publication Data

US 2003/0055833 A1 Mar. 20, 2003

Related U.S. Application Data

(60) Division of application No. 09/471,932, filed on Dec. 23, 1999, now Pat. No. 6,502,097, and a continuation of application No. 09/471,678, filed on Dec. 23, 1999, now Pat. No. 6,476,805.

(51) Int. Cl.
*G06F 17/30* (2006.01)

(52) U.S. Cl. ...................................... 707/100
(58) Field of Classification Search ................. 707/100
See application file for complete search history.

(56) References Cited

U.S. PATENT DOCUMENTS

| | | | |
|---|---|---|---|
| 4,785,349 A | 11/1988 | Keith et al. | 358/136 |
| 4,922,341 A | 5/1990 | Strobach | 358/136 |
| 5,063,444 A * | 11/1991 | Knauer et al. | 375/240.11 |
| 5,148,272 A | 9/1992 | Acampora et al. | 358/133 |
| 5,168,375 A | 12/1992 | Reisch et al. | 358/432 |
| 5,196,933 A | 3/1993 | Henot | 358/136 |
| 5,287,178 A | 2/1994 | Acampora et al. | 348/384 |
| 5,448,297 A | 9/1995 | Alattar et al. | 348/415 |
| 5,477,272 A | 12/1995 | Zhang et al. | 348/407 |
| 5,594,504 A | 1/1997 | Ebrahimi | 348/416 |
| 5,734,737 A | 3/1998 | Chang et al. | 382/107 |
| 5,771,075 A | 6/1998 | Rim et al. | 348/512 |

(Continued)

OTHER PUBLICATIONS

Gray, R. et al., "Image Compression and Tree-Structured Vector Quantization," *Image and Text Compression*, Chapter 1, pp. 3-34 (1992).

(Continued)

*Primary Examiner*—Tim Vo
*Assistant Examiner*—Haythim Alaubaidi
(74) *Attorney, Agent, or Firm*—Klarquist Sparkman, LLP

(57) ABSTRACT

A data structure includes variable-size data objects ["VSDOs"] and enables selective and efficient retrieval of data in particular VSDOs. The data structure includes multiple packets. Each packet includes a reference count field, a references field, and an objects field. The references field stores references to VSDOs within the data structure. The reference count field indicates the number of references stored in the references field. The objects field stores the actual VSDOs. To access a particular VSDO, an accessing unit traverses the reference count fields of the multiple packets until the accessing unit finds a packet that includes the reference to the particular VSDO. The accessing unit accesses the particular VSDO based upon the reference. To further improve the efficiency of an access operation, packets form metapackets. A metapacket header sums the reference count fields of the packets within the metapacket. To access a particular VSDO, an accessing unit traverses the metapacket headers until the accessing unit finds a metapacket that includes a packet having the reference to the particular VSDO. Based upon the reference, the accessing unit accesses the particular VSDO. Storing light field information in VSDOs using the data structure facilitates efficient light field operations and light field operations at selective levels of refinement.

12 Claims, 24 Drawing Sheets

U.S. PATENT DOCUMENTS

| | | | |
|---|---|---|---|
| 5,926,791 A | 7/1999 | Ogata et al. | 704/500 |
| 5,946,043 A | 8/1999 | Lee et al. | 348/420 |
| 6,009,188 A | 12/1999 | Cohen et al. | 382/154 |
| 6,023,523 A | 2/2000 | Cohen et al. | 382/154 |
| 6,028,955 A | 2/2000 | Cohen et al. | 382/154 |
| 6,067,417 A | 5/2000 | Wise et al. | 395/800.18 |
| 6,097,394 A | 8/2000 | Levoy et al. | 345/419 |
| 6,173,355 B1* | 1/2001 | Falik et al. | 710/310 |
| 6,408,030 B1 | 6/2002 | Koda | 375/240.26 |
| 6,535,510 B1* | 3/2003 | Kalkunte et al. | 370/389 |
| 6,681,270 B1* | 1/2004 | Agarwala et al. | 710/40 |

OTHER PUBLICATIONS

Howard, P. et al., "Practical Implementations of Arithmetic Coding," *Image and Text Compression*, Chapter 4, pp. 85-112 (1992).

"Advanced Streaming Format (ASF) Specification," Public Specification Version 1.0, pp. 1-56 (Feb. 26, 1998).

Karlsson, G. et al., "Subband Coding of Video for Packet Networks," Optical Engineering, vol. 27, No. 7, pp. 574-586 (Jul. 1988).

Darragh, J. et al., "Fixed Distortion Subband Coding of Images for Packet-Switched Networks," IEEE J. on Selected Areas in Communications, vol. 7, No. 5, pp. 789-800 (Jun. 1989).

Le Gall, D., "MPEG: A Video Compression Standard for Multimedia Applications," Communications of the ACM, vol. 34, No. 4, pp. 46-58 (Apr. 1991).

Plompen, R., et al., "Motion Video Coding in CCITT SG XV—The Video Source Coding," Reprinted from IEEE Global Telecommunications Conf., vol. 2, pp. 113-120 (Nov./Dec. 1988).

Woods, J., et al., "Subband Coding of Images," Reprinted from IEEE Trans. Acoust., Speech, Signal Processing, vol. ASSP-34, pp. 198-208 (Oct. 1986).

"About Wavelet Technology and Video Compression," IVC Technical Bulletin No. 0014a, pp. 1-5 (Sep. 17, 1997).

Shensa, M., "The Discrete Wavelet Transform: Wedding the A Trous and Mallat Algorithms," IEEE Transactions on Signal Processing, vol. 40, No. 10, pp. 2464-2482 (Oct. 1992).

House, D., "Overview of Three-Dimensional Computer Graphics," *The Computer Science and Engineering Handbook*, Chapter 54, pp. 1193-1211, (1997).

Meng, T. et al., "Portable Video-On-Demand in Wireless Communication," Proceedings of the IEEE, vol. 83, No. 4, pp. 659-680 (Apr. 1995).

Calderbank, A. et al., "Wavelet Transforms That Map Integers to Integers," Applied and Computational Harmonic Analysis, vol. 5, pp. 332-369 (1998).

Watson, A. et al., "Visibility of Wavelet Quantization Noise," IEEE Transactions on Image Processing, vol. 6, No. 8, pp. 1164-1175 (Aug. 1997).

Shapiro, J., "Embedded Image Coding Using Zerotrees of Wavelet Coefficients," IEEE Transactions on Signal Processing, vol. 41, No. 12, pp. 3445-3462 (Dec. 1993).

Levoy, M. et al., "Light Field Rendering," Computer Graphics Proceedings, Annual Conference Series, pp. 31-42 (1996).

Kirk, R., "A 5 Minute Course in Wavelet Transforms," 3 pp.

Gortler, S. et al., "The Lumigraph," Computer Graphics Proceedings, Annual Conference Series, pp. 43-54 (1996).

"MPEG-4 Standard, International Organisation for Standardisation," ISO/IEC JTC1/SC29/WG11, Coding of Moving Pictures and Audio, N2202, Information Technology—Coding of Audio-Visual Objects: Visual, ISO/IEC 14496-2, Committee Draft, Tokyo, 326 pp. (May 28, 1998).

"ITU-T Recommendation H.262," Information Technology—Generic Coding of Moving Pictures and Associated Audio Information: Video, 201 pp. (Jul. 1995).

"ITU-T Recommendation H.263," Series H: Audiovisual and Multimedia Systems, Infrastructure of Audiovisual Services—Coding of Moving Video, Video Coding for Low Bit Rate Communication, 155 pp. (Feb. 1998).

Cosman, P. et al., "Vector Quantization of Image Subbands: A Survey," pp. 1-43 (Jun. 20, 1995).

Solari, S., "Video Compression Techniques: Vector Quantization," *Digital Video and Audio Compression*, Chapter 6, pp. 141-162 (1997).

Solari, S., "Subband Coding," *Digital Video and Audio Compression*, Chapter 7, pp. 163-185 (1997).

Hamming, R., "Some Classical Applications," *Digital Filters*, Chapter 3, pp. 32-63 (1983).

Hamming, R., "Design of Nonrecursive Filters," *Digital Filters*, Chapter 6, pp. 109-133 (1983).

Wei, Li-Yi, *Light Field Compression Using Wavelet Transform and Vector Quantization*, 9 pp. [Downloaded from the World Wide Web on Sep. 26, 2001.].

* cited by examiner

DATA STRUCTURE FOR EFFICIENT ACCESS TO VARIABLE-SIZE DATA OBJECTS

RELATED APPLICATION DATA

This application is a divisional of U.S. patent application Ser. No. 09/471,932, filed Dec. 23, 1999, now U.S Pat. No. 6,502,097 entitled "DATA STRUCTURE FOR EFFICIENT ACCESS TO VARIABLE-SIZE DATA OBJECTS," the disclosure of which is hereby incorporated by reference. This application is a continuation of U.S. patent application Ser. No. 09/471,678, filed Dec. 23, 1999, entitled "TECHNIQUES FOR SPATIAL DISPLACEMENT ESTIMATION AND MULTI-RESOLUTION OPERATIONS ON LIGHT FIELDS," now U.S. Pat. No. 6,476,805, issued Nov. 5, 2002.

TECHNICAL FIELD

The present invention pertains to storage, manipulation, and transmission of variable-size data objects. A data structure that stores variable-size data objects also facilitates efficient access to the variable-size data objects. In one use, the data structure stores light field information to facilitate selective and efficient access to the light field image information.

BACKGROUND OF THE INVENTION

Digital information can be represented as a series of data objects to facilitate processing and storing the digital information. For example, a digital audio or video file can be represented as a series of data objects that contain digital audio or video samples. More generally, a data object is an aggregation of digital information that is related along spatial, temporal, conceptual, or any other lines of significance.

When a series of data objects represents digital information, processing the series is simplified if the data objects are equal size. For example, suppose a video sequence of uncompressed, equal-size images is stored in a data structure. Using an ordinal number of an image in the video sequence, and knowing the size of images in the sequence, a particular image in the video sequence can be accessed as an offset from the beginning of the data structure.

Although access to equal-size data objects in a series is relatively straightforward, in some applications, use of equal-size data objects leads to inefficient storage and transmission. For example, when a video sequence is compressed, video frames may compress to varying sizes. By representing such digital information in variable-size data objects ["VSDOs"], storage and transmission is made more efficient.

Accessing a particular VSDO within a series of VSDOs is relatively complicated, however. Due to the variable sizes of the data objects preceding the VSDO to be accessed, the starting position of the VSDO to be accessed cannot be known based upon an ordinal series number. Thus, to access a VSDO, the VSDOs that precede the VSDO to be accessed must be traversed.

FIG. 3 shows a prior art data stream 100 for a compressed image. The data stream 100 starts with a header 110. Blocks 120 of data, corresponding to entropy-coded, quantized transform coefficients for blocks of the image, follow the header 110. The blocks 120 have variable length. Each block indicates its end with an end of block code 130. After an end of block code 130, the following block 120 begins. The data stream 100 ends with an end of stream code 140.

Consider, for example, a decompression and display technique in which data in every block 120 of data stream 100 is accessed and decoded in order to display the compressed image in data stream 100. Starting from the beginning of the data stream 100, blocks 120 are accessed and decoded in a linear manner until the end of stream code 140 is reached. Although linear retrieval of blocks is time consuming, every block that is retrieved is also used. Similarly, if a video sequence is encoded into a data stream such as data stream 100, each block of data is retrieved and used to display the video sequence.

In contrast, consider a light field rendering operation, which has different characteristics than a video display operation. In a light field rendering operation, light field samples dispersed throughout a light field are retrieved and processed to estimate a view from some arbitrary point in space.

A light field models the light characteristics of an object or static scene, for example, by capturing light intensity and color values along a surface around a static scene. To map a light field to a computational framework requires a discrete representation. FIGS. 1 and 2 depict a discretized light field 10. Light field 10 includes a set of spatially-related light field images of an object 20. FIG. 1 shows expanded views of light field images 12 and 14. A light field image comprises a two-dimensional arrangement (s,t) of data values such as values from a color space. Light rays from the object 20 that pass through a light field image (s,t) also pass through a focal point 32 in the (u,v) plane. A (s,t,u,v) grid point is indexed with (i,j,p,q). Capture and generation of light fields, different parameterizations of light fields, and light field image rendering, as well as other aspects of light fields, are described in Gortler et al., "The Lumigraph," Computer Graphics Proceedings, Annual Conference Series, 1996, pp. 43–54 ["the Gortler reference"] and Levoy et al., "Light Field Rendering," Computer Graphics Proceedings, Annual Conference Series, 1996, pp. 31–42 ["the Levoy reference"].

Storage and transmission of light fields present difficulties due to the amount of digital information in a typical light field. An illustrative light field consists of 16×16 focal points in the focal plane (u,v). If each light field image has a resolution of 256×256 and stores 24-bit RGB values, the total amount of storage is: 16×16×256×256×3 bytes=48 Mbytes. Compression of light field information can reduce the representation of the light field image information, usually at some cost to the quality of the information and the speed of accessing the information. Compression of light field information typically results in VSDOs.

In addition to the considerable storage and transmission requirements for a light field, manipulation of light field images presents considerable memory and processing requirements. Light field rendering is the process of creating a view of an object or static scene based upon a light field, e.g., by interpolating from known light field image values. During light field rendering, parts of selected light field images are retrieved to construct a view from a novel perspective. Depending on the perspective of the novel view being rendered, different light field images are retrieved. Because rendering typically uses different parts of different light field images according to a complex pattern of access, random access to parts of light field images facilitates rendering. Unfortunately, loading multiple light field images into random access memory (to facilitate random access to dispersed light field samples) consumes large amounts of memory given the size of a typical light field image.

Moreover, even after light field images are loaded into memory, light field operations are computationally complex, especially when decompression of the light field information is required.

These high memory and processing requirements hinder real time rendering, especially for serialized rendering operations. To return to FIG. 3, suppose that during a light field rendering operation only the light field information in Block n 126 needs to be accessed. The starting point of block n 126 is not known in advance. The sizes of the blocks 120 preceding block n 126 are not known in advance. Even though only information in block n 126 is needed, it is necessary to start retrieving blocks in a linear manner from the beginning of the data stream 100. This linear, sequential retrieval wastes resources because many blocks that are retrieved are not used in the rendering operation. This inefficiency is exacerbated when numerous non-sequential, dispersed light field samples must be retrieved. Furthermore, retrieval of block n 126 can be disrupted by corruption of the data preceding block n 126 in the data stream 100.

SUMMARY OF THE INVENTION

The present invention pertains to efficient storage, manipulation, and transmission of digital information with variable-size data objects ["VSDOs"]. A data structure contains digital information in a series of VSDOs for efficient storage and transmission of the digital information. Using the data structure, particular VSDOs within the data structure are selectively, rapidly, and efficiently accessed. For example, using the data structure to store data for a light field data stream, selective portions of the data stream can be rapidly and efficiently accessed.

The data structure with VSDOs includes one or more packets. A packet has at least three fields: the reference count field, the references field, and the object field. In the illustrative embodiment, a packet begins with the reference count field, followed by the references field and the objects field.

The references field of a packet contains data representing references to locations of VSDOs. In the illustrative embodiment, the references are pointers to locations of VSDOs within the data structure.

Alternatively, the references are size values for VSDOs or other offsets to locations of VSDOs within the data structure. To ensure the integrity of the data stored in the references field, the references field can contain error detection and/or error correction data.

The objects field of a packet contains data representing at least portions of one or more VSDOs. The VSDOs hold data for light field images or other spatially related views of an object or scene, e.g., surface textures. Alternatively, the VSDOs hold other information.

The reference count field of a packet contains data representing a number k of references to VSDOs. During an access operation for a VSDO in the data structure with VSDOs, the reference count field of a packet is examined to determine whether the references field of the packet includes a reference to the VSDO-to-be-accessed. For example, the number k in the reference count field is the number of references in the references field of a packet. Alternatively, the number k is the cumulative number of references in the references fields of a packet and all preceding packets in the data structure with VSDOs. The reference count field can contain error detection and/or error correction data.

A packet can be viewed as a series of n-bit units. When n is a multiple of 8, the packet is byte-aligned, which typically facilitates processing. In the illustrative embodiment, the length of a packet is $2^n$ n-bit units or less. Thus, any unit of the packet is addressable with an n-bit address. To reference unit locations within a packet, each of the reference in the references field of the packet is a single unit long. VSDOs in the objects field of the packet are padded out to the nearest n-bit unit.

Because packet length is no greater than $2^n$ n-bit units in the illustrative embodiment, at times a VSDO that is referenced in the references field of a packet will not fit within the objects field of the same packet.

If part, but not all, of a VSDO fits within the objects field of a packet, the objects field of the packet stores as much of the VSDO as possible. The objects fields of one or more other packets store the remainder of the split VSDO. The references field of the first packet includes a reference to the split VSDO, and the reference count field of the first packet counts that reference. The references fields of other packets do not include any reference to the split VSDO, nor do the reference count fields of those other packets count any reference to the split VSDO.

If a reference to a VSDO fits within the references field of a packet, but none of the VSDO fits within the objects field of the same packet, the reference to the VSDO in that packet is a null value. The objects fields of one or more other packets store the VSDO. The reference count field of the first packet counts that reference. The references fields of the other packets do not include any reference to the VSDO, nor do the reference count fields of those other packets count any reference to the VSDO.

If a packet has space remaining in its objects field after a last VSDO, the packet is truncated after the n-bit unit containing the last portion of the last VSDO.

A data structure with VSDOs can be part of a composite data structure. For example, a data structure with VSDOs can adjoin a second data structure to form a composite data structure.

According to another aspect of the present invention, a packetizing unit fills a packet with VSDOs for a data structure with VSDOs. The packetizing unit iteratively processes VSDOs until it has processed enough VSDOs to write to the packet. The packetizing unit designates a VSDO and tracks whether enough VSDOs have been processed to fill a packet. When enough VSDOs have been processed to fill the packet, the packetizing unit writes data to the reference count field of the packet. The packetizing unit then writes data for processed VSDOs to the references and objects fields of the packet. After the packetizing unit finishes writing VSDO information to the packet, the packetizing unit prepares to fill a subsequent packet.

For example, the packetizing unit tracks readiness to write to the packet by incrementing a cumulative designated VSDO count. The packetizing unit also updates a cumulative size value for VSDOs and references to VSDOs. The packetizing unit determines when enough VSDOs have been processed to fill a packet by comparing the cumulative size value to a packet size threshold. When ready to fill the packet, the packetizing unit writes the designated VSDO count to the reference count field of the packet. The packetizing unit then reserves space in the references field of the packet for references to VSDOs. For each VSDO that has been designated, the packetizing unit writes a reference in the references field and writes the VSDO to the objects field of the packet, to the extent space allows in the objects field. When the packetizing unit finishes writing VSDO information to the packet, the packetizing unit prepares to fill a subsequent packet by adjusting the counts and size variables used to track VSDOs.

According to another aspect of the present invention, an accessing unit accesses a VSDO in a data structure with VSDOs. When the data structure contains a single packet, the accessing unit receives a numerical selection m that corresponds to a VSDO to be accessed. The accessing unit retrieves the $m^{th}$ reference of the data structure. The accessing unit accesses the corresponding VSDO based upon the retrieved reference.

When the data structure contains multiple packets, the accessing unit receives a numerical selection m that corresponds to a VSDO to be accessed. The accessing unit selects a packet in the data structure to be the focus of processing, for example, the first packet. Based upon the value in the reference count field of the focus packet, the accessing unit determines whether the focus packet contains a reference corresponding to numerical selection m. If the focus packet contains such a reference, the accessing unit accesses the VSDO corresponding to m based upon the reference. If the focus packet does not contain such a reference, the accessing unit checks a subsequent focus packet. If the accessing unit reaches the end of the data structure without finding a reference corresponding to numerical selection m, the accessing unit terminates the accessing operation. Thus, a VSDO is selectively, rapidly, and efficiently retrieved without processing the VSDOs or references to VSDOs that proceed the packet in the data structure.

For example, the accessing unit uses a cumulative reference count to determine whether the focus packet contains a reference corresponding to numerical selection m. The accessing unit adds the value of the reference count field of the focus packet to the cumulative reference count. The accessing unit then compares the cumulative reference count to numerical selection m. If m is less than or equal to the cumulative reference count, the accessing unit retrieves a reference to a VSDO within the focus packet. Alternatively, the accessing unit uses other techniques to determine whether the focus packet contains a reference corresponding to numerical selection m.

According to another aspect of the present invention, a data structure with VSDOs includes one or more metapackets. A metapacket includes a header value and one or more packets. The header value relates to the total number of references to VSDOs within the packets of the metapacket. During an access operation for a VSDO in the data structure with metapackets, the header field of a metapacket is examined to determine whether a packet within the metapacket includes a reference to the VSDO-to-be-accessed. The header value can contain error detection and/or error correction data.

According to another aspect of the present invention, an accessing unit accesses a VSDO in a data structure with one or more metapackets. An accessing unit receives a numerical selection m that corresponds to a VSDO to be accessed within a group of metapackets. The accessing unit selects a metapacket in the data structure to be the focus of processing, for example, the first metapacket. Based upon the header value of the focus metapacket, the accessing unit determines whether a packet of the focus metapacket contains a reference corresponding to m. If the focus metapacket contains a packet with such a reference, the accessing unit accesses the VSDO corresponding to m. Otherwise, the accessing unit checks a subsequent focus metapacket. If the accessing unit reaches the end of the data structure without finding a reference corresponding to m, the accessing unit terminates the accessing operation. Thus, a VSDO is selectively, rapidly, and efficiently retrieved without processing the VSDOs, references, or reference count fields of packets with the preceding metapackets of the data structure.

According to another aspect of the present invention, a transmitter transmits to a receiver digital information formatted in a data structure with VSDOs. After reception, VSDOs within the data structure are accessed.

In one use of the present invention, light field information is stored in an efficient manner using a data structure with VSDOs. For a light field image that has been separated into base layer information and enhancement layer information, the data structure with VSDOs facilitates efficient light field operations. Base layer information provides a low granularity version of the light field image, while enhancement layer information refines that low granularity version. VSDOs that include enhancement layer information are selectively and efficiently accessed.

Additional features and advantages of the invention will be made apparent from the following detailed description of an illustrative embodiment that proceeds with reference to the accompanying drawings.

DETAILED DESCRIPTION OF AN ILLUSTRATIVE EMBODIMENT

The illustrative embodiment of the present invention is directed to efficient storage and manipulation of variable-size data objects ["VSDOs"] using a data structure with VSDOs. In a recurring example, the VSDOs are for light field information. To provide proper context for the illustrative embodiment, the following description includes details about data, data structures, operations, and other software and hardware components used at various stages of the illustrative embodiment or used in conjunction with the illustrative embodiment.

The section entitled "Exemplary Computer System" describes a suitable computing environment for the illustrative embodiment.

The section entitled "Light Fields" describes light fields and operations such as light field rendering for reference and prediction light field images. This section also treats the applicability of the present invention to other types of data.

The section entitled "Exemplary Data Structures" describes data structures that store VSDOs and facilitate efficient access to the VSDOs. Techniques are presented for filling data structures with VSDOs, efficiently accessing particular VSDOs, transmitting the data structures, and otherwise manipulating the data structures.

The section entitled "Using the Exemplary Data Structures in Light Field Operations" describes techniques for using the exemplary data structures to store light field information. For a light field image that includes base layer information and enhancement layer information, the exemplary data structures facilitate selective, efficient access to and decompression of enhancement layer information.

While the following detailed description typically explains the illustrative embodiment in terms of techniques and data structures, the present invention also includes the tangible implementations and manifestations of the techniques and data structures.

I. Exemplary Computer System

Figure 4:
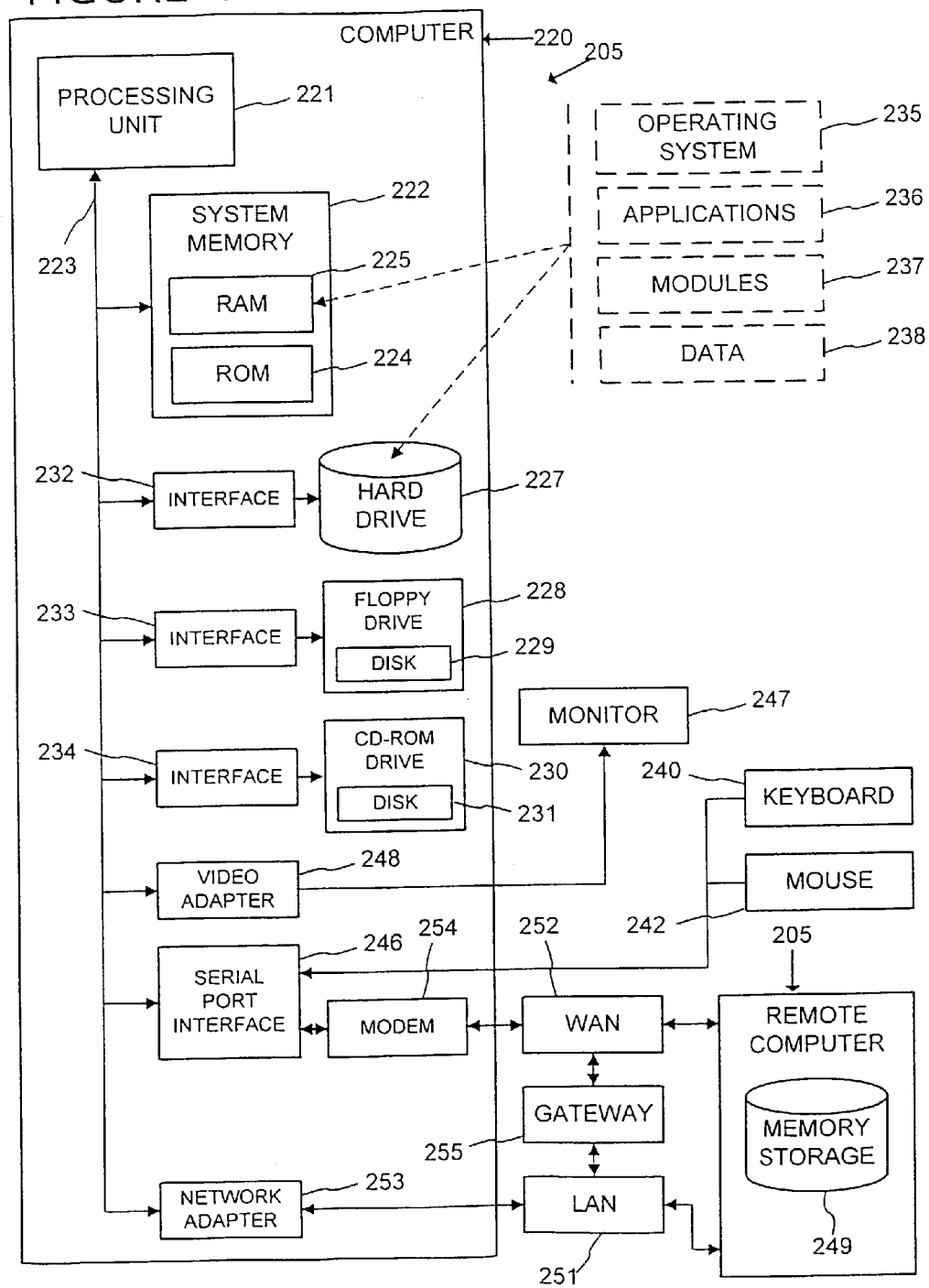
FIG. 4 is a block diagram of a computer system that can be used to implement the present invention.

FIG. 4 and the following discussion are intended to provide a brief, general description of a suitable computing environment in which the illustrative embodiment can be implemented. While the illustrative embodiment is at times described in the general context of computer-executable instructions that run on computers, those skilled in the art will recognize that the illustrative embodiment can be implemented as a combination of program modules, or in combination with other program modules. Generally, program modules include routines, programs, components, data structures, etc. that perform particular tasks or implement particular abstract data types. The illustrative embodiment can be implemented as a distributed application, one including program modules located on different computers in a distributed computing environment. The illustrative embodiment can be implemented as one or more application-specific integrated circuits or as an improvement upon existing integrated circuits. Moreover, the illustrative embodiment can be implemented as a combination of the above software and hardware implementations.

FIG. 4 illustrates an example of a computer system 205 that can serve as an operating environment for the illustrative embodiment. The computer system 205 can be any of several types of computer system configurations, including personal computers, hand-held devices, multiprocessor systems, microprocessor-based or programmable consumer electronics, minicomputers, mainframe computers, and the like.

With reference to FIG. 4, an exemplary computer system for implementing the illustrative embodiment includes a computer 220 (such as a personal computer, laptop, palmtop, set-top, server, mainframe, and other varieties of computer), including a processing unit 221, a system memory 222, and a system bus 223 that couples various system components including the system memory to the processing unit 221. The processing unit can be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM; and Motorola. Dual microprocessors and other multi-processor architectures also can be used as the processing unit 221.

The system bus can be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 224 and random access memory (RAM) 225. A basic input/output system (BIOS), containing the basic routines that help to transfer information between elements within the computer 220, such as during start-up, is stored in ROM 224.

The computer 220 further includes a hard disk drive 227, a magnetic disk drive 228, e.g., to read from or write to a removable disk 229, and an optical disk drive 230, e.g., for reading a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of data, data structures, computer-executable instructions, etc. for the computer 220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment.

A number of program modules can be stored in the drives and RAM 225, including an operating system 235, one or more application programs 236, other program modules 237, and program data 238.

A user can enter commands and information into the computer 220 through a keyboard 240 and pointing device, such as a mouse 242. Other input devices (not shown) can include a microphone, joystick, game pad, satellite dish, scanner, or the like. These and other input devices are often connected to the processing unit 221 through a serial port interface 246 that is coupled to the system bus, but can be connected by other interfaces, such as a parallel port, game port or a universal serial bus (USB). A monitor 247 or other type of display device is also connected to the system bus 223 via an interface, such as a video adapter 248. To improve performance for multimedia, computers can include other multimedia adapters (not shown), such as a sound card or other multimedia card. In addition to the monitor, computers typically include other peripheral output devices (not shown), such as speakers and printers.

The computer 220 can operate in a networked environment using logical connections to one or more other computer systems 205. The other computer systems 205 can be clients, servers, routers, peer devices or other common network nodes, and typically include many or all of the elements described relative to the computer 220, although only a memory storage device 249 has been illustrated in FIG. 4. The logical connections depicted in FIG. 4 include a local area network (LAN) 251 and a wide area network (WAN) 252. Such networking environments are commonplace in offices, enterprise-wide computer networks, intranets and the Internet. Other types of connections (not shown) include satellite, infrared, and radio frequency connections, broadcast and cable TV connections, and other packet and circuit-switched connections.

When used in a LAN networking environment, the computer 220 is connected to the local network 251 through a network interface or adapter 253. When used in a WAN networking environment, the computer 220 typically includes a modem 254 or other means for establishing communications (e.g., via the LAN 251 and a gateway or proxy server 255) over the wide area network 252, such as the Internet. The modem 254, which can be internal or external, is connected to the system bus 223 via the serial port interface 246. In a networked environment, program modules depicted relative to the computer 220, or portions thereof, can be stored in the remote memory storage device. It will be appreciated that the network connections shown are exemplary and other means of establishing a communications link between the computer systems 205 (including an Ethernet card, ISDN terminal adapter, ADSL modem, 10BaseT adapter, 100BaseT adapter, ATM adapter, or the like) can be used.

In accordance with the practices of persons skilled in the art of computer programming, the illustrative embodiment is described below with reference to acts and symbolic representations of operations that are performed by the computer 220, unless indicated otherwise. Such acts and operations are sometimes referred to as being computer-executed. It will be appreciated that the acts and symbolically represented operations include the manipulation by the processing unit 221 of electrical signals representing data bits which causes a resulting transformation or reduction of the electrical signal representation, and the maintenance of data bits at memory locations in the memory system (including the system memory 222, hard drive 227, floppy disks 229, and CD-ROM 231) to thereby reconfigure or otherwise alter the computer system's operation, as well as other processing of signals. The memory locations where data bits are maintained are physical locations that have particular electrical, magnetic, or optical properties corresponding to the data bits.

II. Light Fields

In one use of the illustrative embodiment, a data structure with VSDOs facilitates efficient manipulation of light field images. Although the data structure with VSDOs can be used with other types of information, the following description presents material on light fields to facilitate understanding of the illustrative embodiment.

A light field models the light leaving a bounded object or entering a bounded region of space. For an object or static scene, light intensity and color values are captured along a surface that encloses the object or static scene. At an arbitrary point in space, one can determine light intensity and color values for light rays emanating from the object or static scene by tracing the light rays backwards to the enclosing surface. Alternatively, an "outward-looking" light field captures the light rays entering a bounded empty convex region of space. At an arbitrary point inside the region, light rays can be traced back to intersections on the bounding surface.

A light field can be parameterized using two concentric surfaces, for example, two concentric cubes enclosing an object. Without loss of generality, the following description considers one plane of an inner cubical surface and a corresponding outer plane, such as those depicted in FIGS. 1 and 2.

Figure 1:
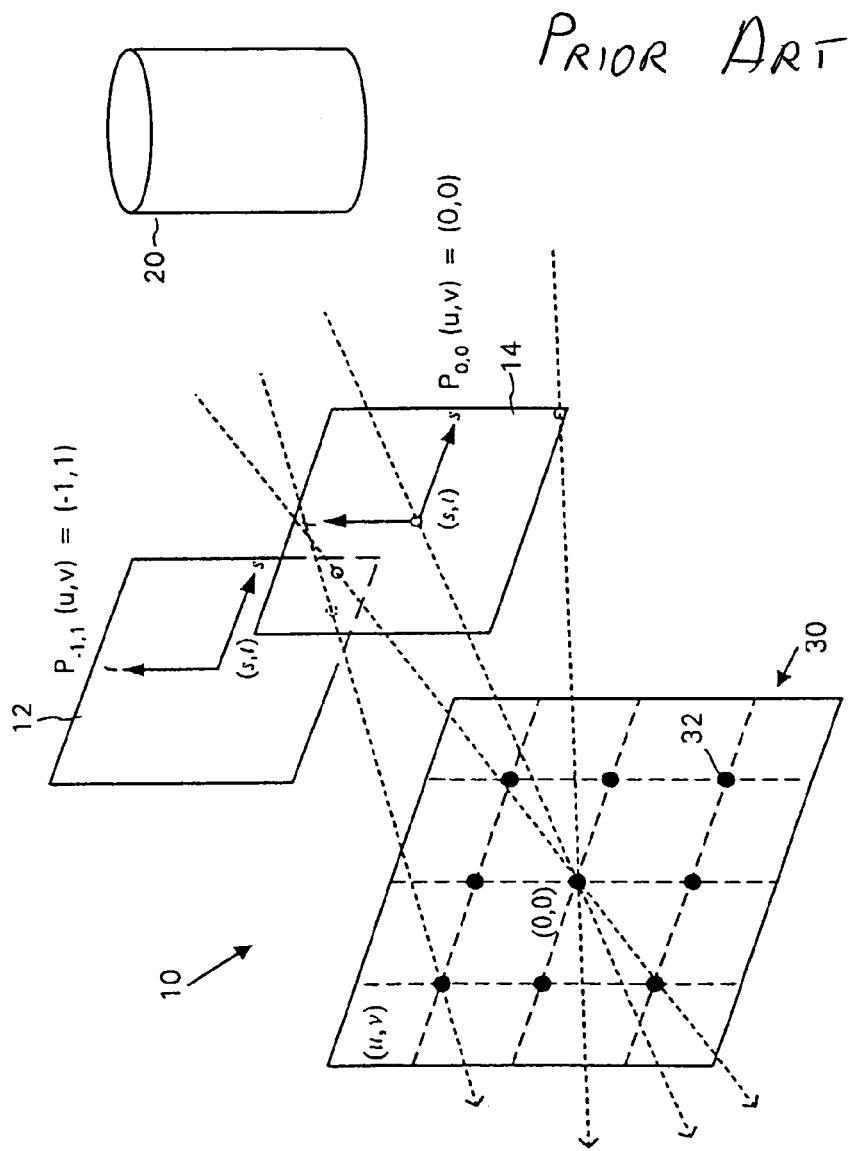
FIG. 1 is a diagram showing light field images of an object according to prior art.
Figure 2:
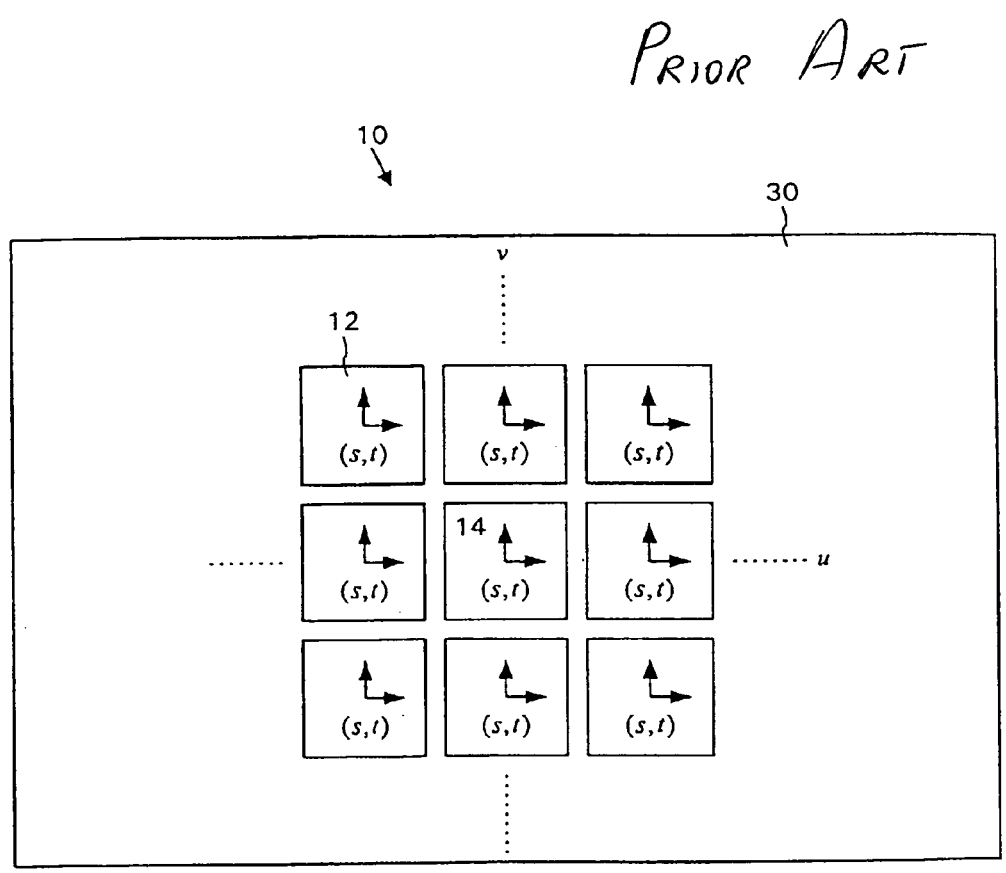
FIG. 2 is a block diagram showing a two-dimensional array of light field images according to prior art.
Figure 3:
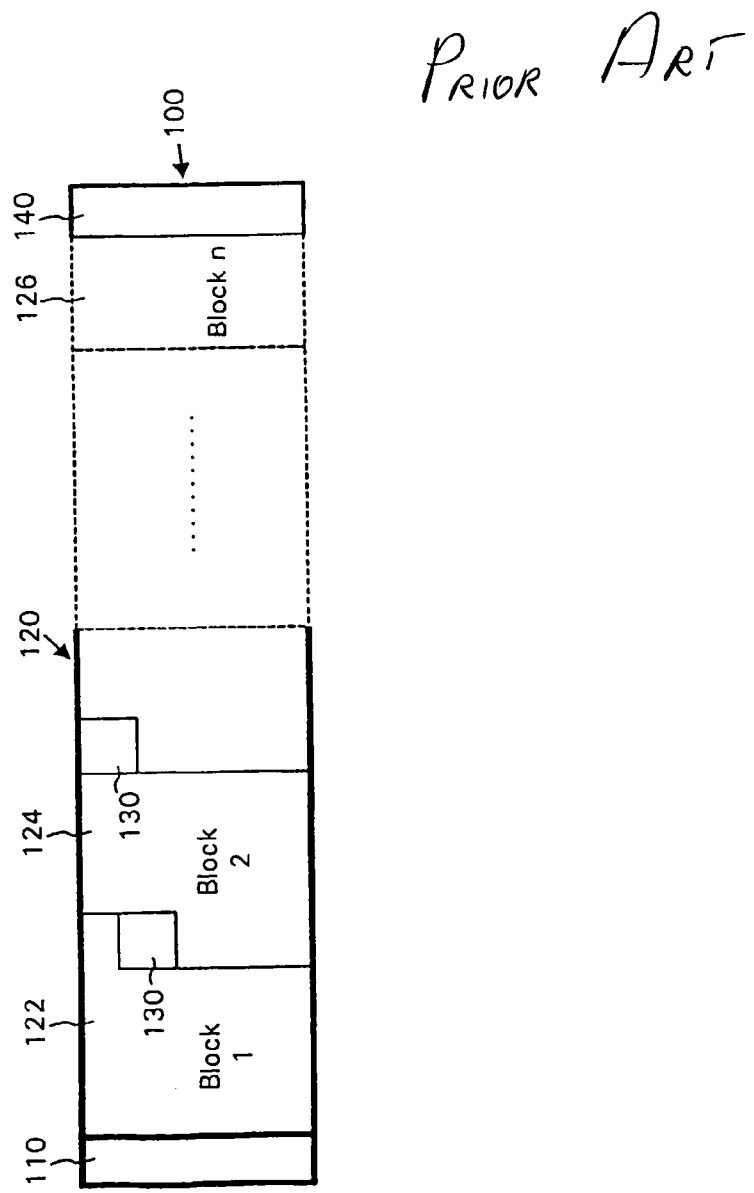
FIG. 3 is a block diagram of a data structure with variable-size data objects according to prior art.

With reference to FIGS. 1 and 2, light field 10 includes a set of spatially-related light field images of an object 20. A light field image comprises a two-dimensional arrangement (s,t) of data values such as values from a color space (e.g., RGB, YUV, YIQ, or gray scale). An (s,t) grid point is indexed with (i,j). Light rays from the object 20 that pass through a light field image (s,t) also pass through a point in a (u,v) plane, e.g., through a focal point 32 on a two-dimensional (u,v) plane 30. A (u,v) grid point is indexed with (p,q). In FIG. 1, light rays from light field image 12 pass through focal point $P_{-1,1}$, while light rays from light field image 14 pass through focal point $P_{0,0}$. A (s,t,u,v) grid point is indexed with (i,j,p,q). While nine focal points 32 are depicted in FIGS. 1 and 2, alternatively, the (u,v) plane includes more or less focal points. Moreover, alternatively, an arbitrarily shaped plane, loop, or enclosing surface includes points for a light field model of an object or static scene.

A light field is generated by capturing light field images from points at multiple perspectives around an object or static scene. The light field images can be captured at the same instant or at different times, e.g., by a camera attached to a gantry moving in a fixed pattern. While the images of a light field are spatially related, temporal relationships between light field images are not fixed. The images can be captured simultaneously. For example, separate cameras in a parallel array can be used to capture images in real time from vantage points around an object or scene. Alternatively, different images can be taken at different times. If the light field portrays a real-world objector static scene, a camera on a robotic arm or sliding track can generate the images from various pre-defined or arbitrary positions. Alternatively, a hand-held camera generates the images. If the light field portrays a synthetic object, images of the synthetic object from different vantage points can be iteratively generated. A light field can be used in conjunction with another light field. Different light fields can be temporally-related. Various aspects of light fields are described in Gortler et al., "The Lumigraph," Computer Graphics Proceedings, Annual Conference Series, 1996, pp. 43–54 ["the Gortler reference"] and Levoy et al., "Light Field Rendering," Computer Graphics Proceedings, Annual Conference Series, 1996, pp. 31–42 ["the Levoy reference"].

A light field can be used in conjunction with a geometric model such as a three-dimensional geometric model of an object or static scene. The Gortler reference describes one technique for using geometric information derived from a set of light field images to create a geometric model. The geometric model is then used to refine a "Lumigraph" function by depth correction of basis functions for the Lumigraph function. As is known in the art, three-dimensional geometric models include, for example, polygon meshes, wireframe representations, parametric surfaces, and implicit surf aces.

Aside from light fields, many other areas in computer graphics and computer vision involve representation of light. These areas include light source/shadow maps, real and virtual environment maps, radiance maps, and ray tracing procedures. As noted, a light field is a set of spatially-related images of an object or static scene. Generally, a set of spatially-related views of an object or static scene is a group of two-dimensional planar projections of the object or static scene. Other types of spatially-related views of an object or static scene include, for example, a set of texture maps. In other uses, instead of storing light field information or other graphical information, the data structure with VSDOs stores some other type of information that benefits from efficient selective access.

Macroblock Organization

Figure 5:
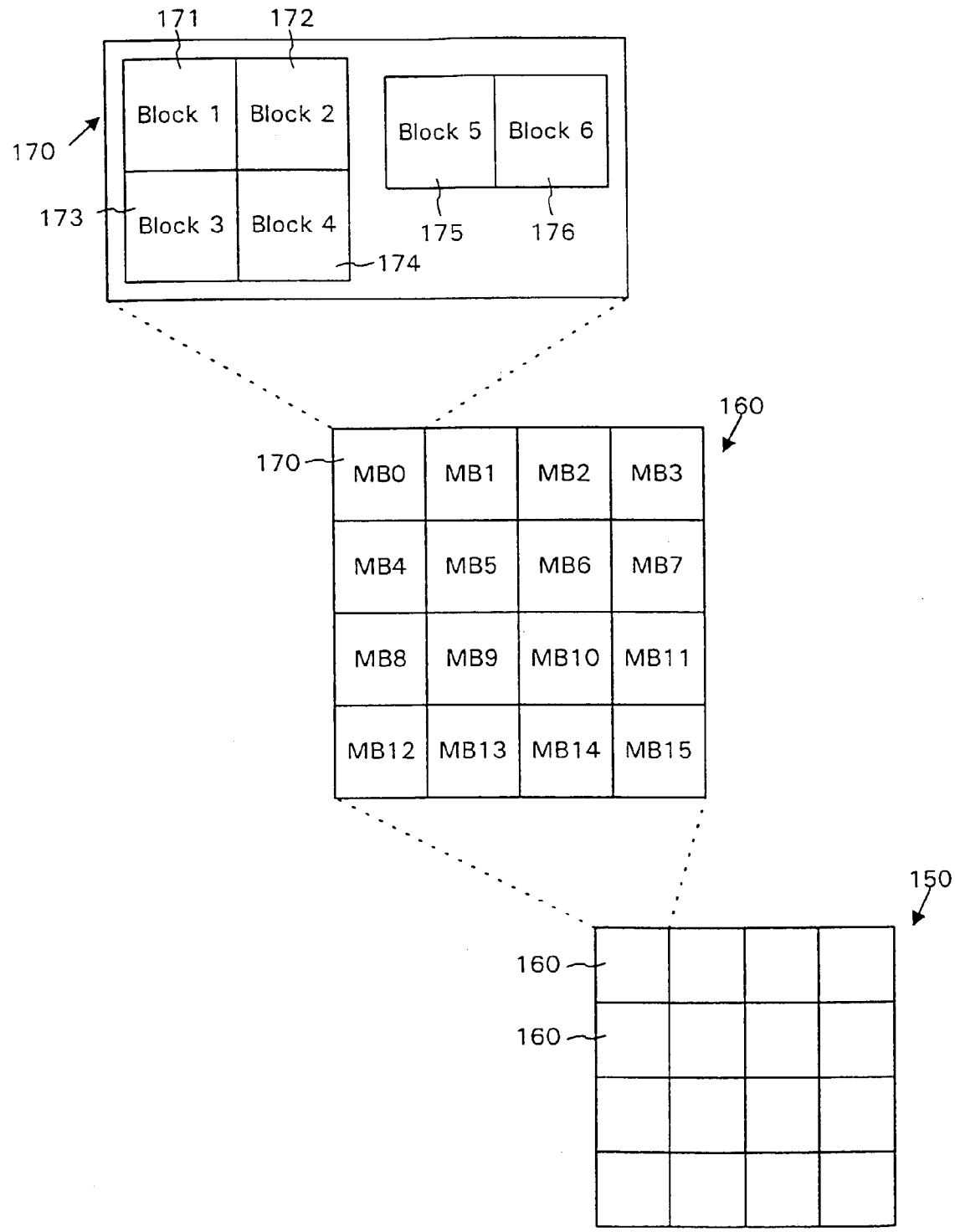
FIG. 5 is a block diagram showing a segmented light field image, a group of macroblocks, and a macroblock of light field image information.

By default in the illustrative embodiment, a light field image is organized by groups of macroblocks ["GMBs"]. FIG. 5 shows a light field image 150 and an expanded view of a GMB. The light field image 150 includes 16 GMBs 160. As shown in FIG. 5, a GMB 160 includes 16 macroblocks ["MBs"] 170. MB 170 in FIG. 5 is a 4:2:0 MB of a light field image. Each MB includes four luminance (Y) blocks 171–174 and two chrominance blocks (U, V) 175–176. The luminance blocks 171–174 are 8×8 blocks of light intensity values for a MB. The chrominance blocks 175–176 are 8×8 blocks of color offset values for the MB. With this configuration of blocks, a MB has a 16×16 luminance resolution and a 8×8 chrominance resolution. In general, a GMB is an ($N_{GMB} \times N_{GMB}$) array of non-overlapping MBs, where $N_{GAB}$ is a resolution in pixels. In FIG. 5, $N_{GAB}$ is 64, so the GMB 160 is a 4×4 array of 16×16 MBs. As is known in the art, other light field image sizes, other light field image organization sections, other resolutions of GMB and MB, other configurations of blocks within a MB (e.g., 4:2:2), and pixel values in other color spaces are possible.

A MB includes luminance and chrominance components. For coding operations involving a MB, the luminance component is often treated separately from the chrominance component. In general, the operations described with reference to whole, or composite MBs, can be carried out only for certain MB components, and vice versa.

Storage and Transmission of Light Fields

Light fields include large amounts of information. An illustrative light field consists of 16×16 points in the plane (u,v). If each light field image has a resolution of 256×256 in the 24-bit YUV color space as in FIG. 5, the total amount of storage is:

16×16×(256×256+(2×128×128))×1 byte=24 Mbytes.

Within a light field, light field images typically exhibit spatial similarities, e.g., because they are taken at adjacent locations. Therefore, there is often a significant amount of redundancy in the light field images. Storage and transmission of the light field images is made more efficient by removing such redundancy.

Light Field Rendering

Figure 6:
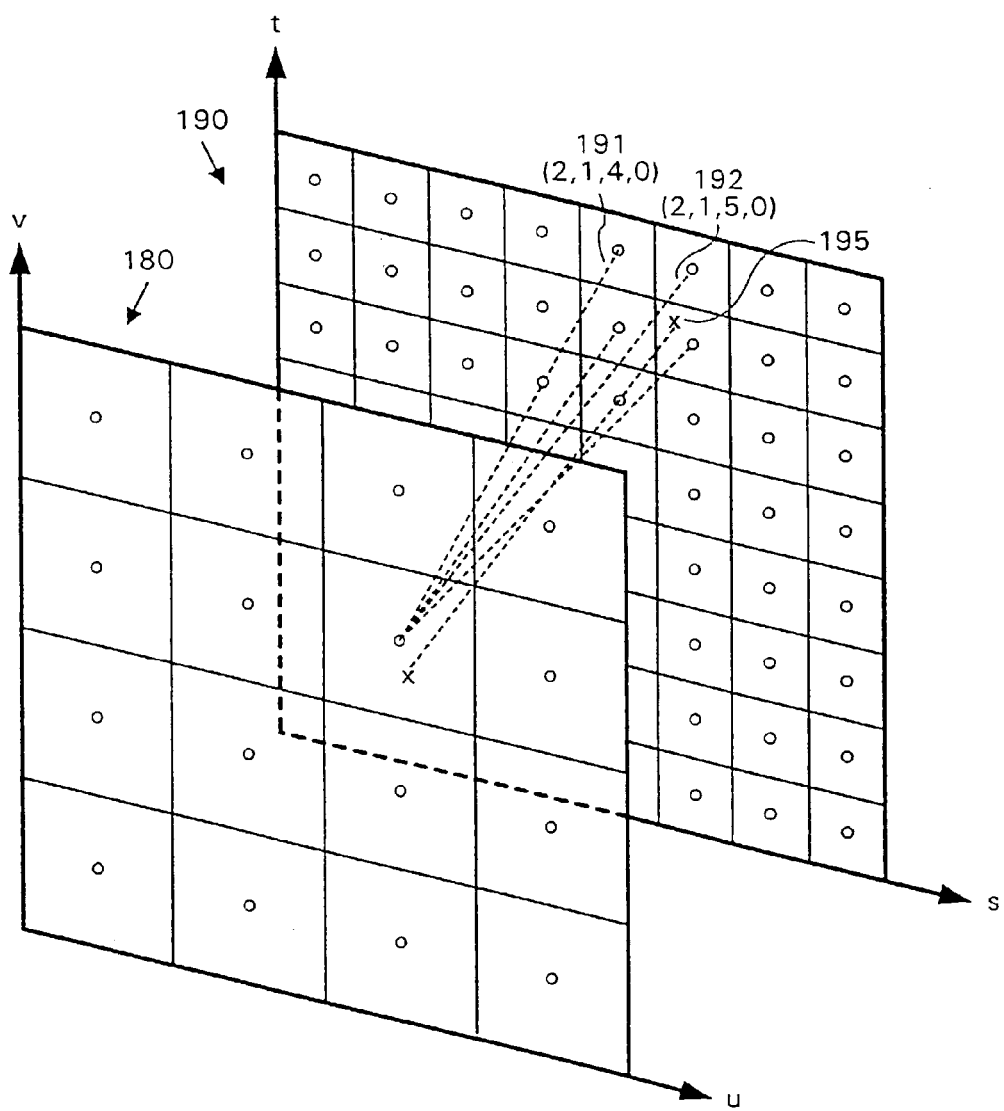
FIG. 6 is a diagram showing an intersection point on a discretized light field for a novel perspective light field image pixel during a rendering operation.

FIG. 6 shows an intersection point for a novel perspective light field image pixel on a discretized light field image for a rendering operation. A discretized light field image in a plane (s,t) 190 represents light rays that go through a focal point in the focal plane (u,v) 180. In FIG. 6, the (u,v) plane includes 16 focal points and the light field image plane (s,t) includes 64 points, but, in general, these planes can include more or less points. A light ray for the discretized light field image has coordinates (i,j,p,q) that correspond to intercept points in the (s,t) and (u,v) planes. Light rays 191 and 192 pass through points (2,1,4,0) and (2,1,5,0), respectively.

Rendering involves estimating values for locations on a continuous light field based upon values in the discretized light field. To render a light field image at a novel perspective, pixels of the novel perspective light field image are created pixel by pixel, light ray by light ray, based upon a light field. After establishing the perspective of the novel perspective light field image, light rays are traced from a novel perspective light field image to intersect the (u,v) and (s,t) planes of the light field. For example, with reference to FIG. 6, a light ray for a novel perspective light field image pixel is traced back to the light field. The light ray intersects the light field in the (s,t) and (u,v) planes at a four coordinate intersection point 195. Based upon the intersection point, a pixel value is determined using basis functions for the light field and values for one or more grid points (i,j,p,q) for light rays that come close to matching the traced light ray. A basis function associates a range of locations in a continuous light field with one or more discretized light field 4-D grid points. For a constant basis function, the novel perspective light field image pixel is given the value of the grid point (i,j,p,q) in the light field that is closest to the intersection point for the traced light ray. For a quadrilinear basis function, the novel perspective light field image pixel is given a value based on weighted interpolation of values of grid points (i,j,p,q) closest in multiple directions (e.g., 16 directions for a 4-dimensional hypercube) to the intersection of the traced light ray. For other basis functions, other techniques are used to weight grid point (i,j,p,q) values to yield a novel perspective light field image pixel value.

Rendering imposes considerable memory and processing requirements on a computer system due to the size of light field images, the complexity of the rendering operation, and the complexity of decoding compressed light fields. Serialized rendering operations, which give a viewer the impression of scrolling around an object or static scene, exacerbate these system requirements. Rendering requires manipulation of numerous light field images. During rendering, parts of selected light field images are retrieved and used to construct a view from a novel perspective. Depending on the perspective of the novel view being rendered, selected parts of selected light field images are processed. Techniques for efficiently accessing and decompressing selected parts of selected light field images are described below.

The complexity of certain rendering operations can be reduced without excessively degrading the subjective quality of the rendered views, e.g., by exploiting perceptual weaknesses of the human visual system. For example, during periods of rapid movement the human eye does not perceive detail well. Thus, for rapid serial rendering operations, low-resolution versions of perspective views provide sufficient quality and at the same time reduce processing and memory requirements. Other quality loss may be necessary to support real time rendering, e.g., due to a memory, processor, transmission, or other limitation on the computer system. Techniques for processing light fields to facilitate efficient selective resolution access, decompression, and rendering are described below. For a light field separated into base layer information and enhancement layer information, depending on the current memory, processing, transmission, or other system capabilities, the quality of rendered views can be selectively degraded or enhanced.

Reference and Prediction Light Field Images

Figure 7:
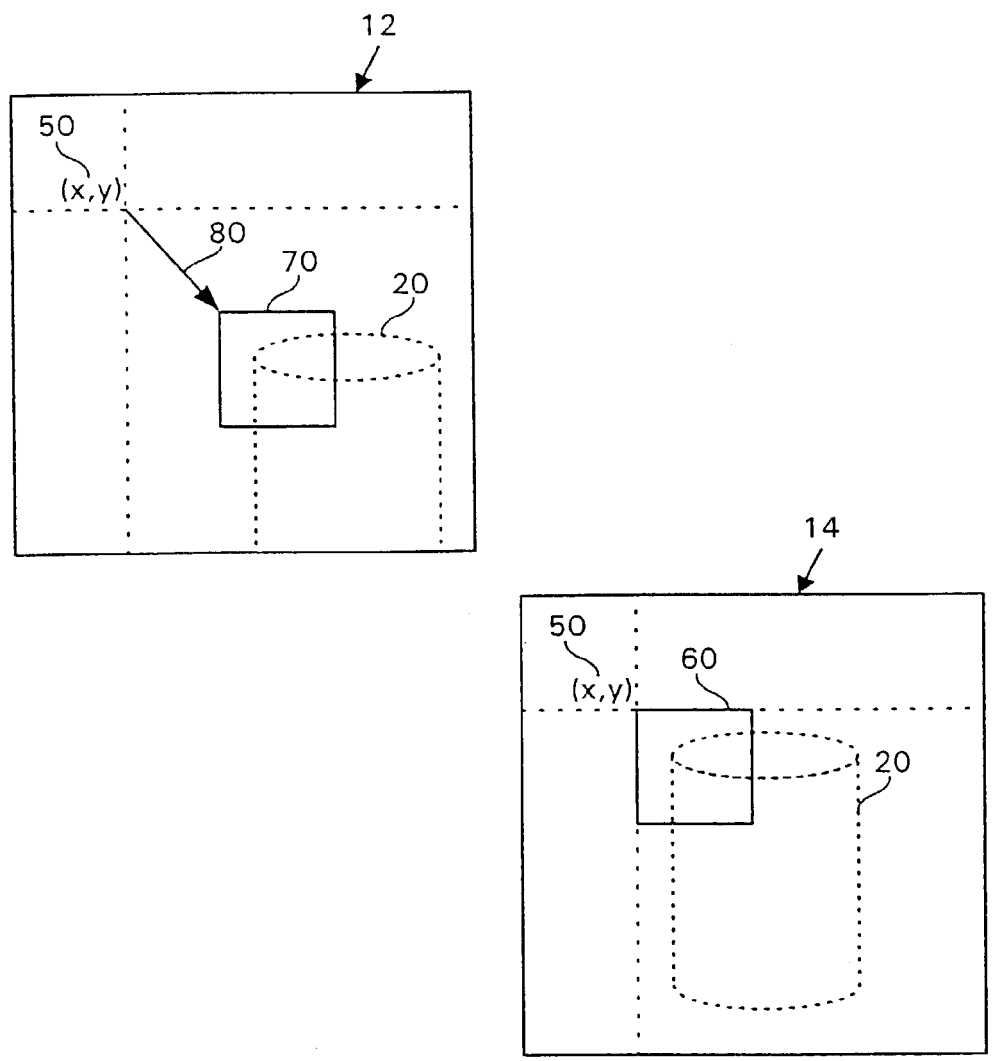
FIG. 7 is a block diagram showing estimation of spatial displacement from a reference light field image for a section of a prediction light field image.

Images from neighboring vantage points around an object or static scene often overlap to some extent, which creates inter-image spatial redundancy. For example, light field images 12 and 14 in FIG. 1 may exhibit spatial redundancy. Inter-image spatial redundancy can be reduced by estimating spatial displacement of a "prediction" light field image from one or more "reference" light field images. This also compresses representation of the prediction light field images. A reference light field image itself is compressed without reference to other light field images. FIG. 7 shows a spatial displacement estimate from a reference light field image 12 for a section of a prediction light field image 14.

III. Exemplary Data Structures

According to one aspect of the illustrative embodiment, a data structure stores digital information using variable-size data objects ["VSDOs"]. Storing digital information with VSDOs, as opposed to equal-size data objects, reduces storage and transmission requirements. Moreover, although the data structure utilizes VSDOs, the data structure provides for efficient and rapid selective access to particular VSDOs, facilitating selective manipulation of the digital information. In one use, the data structure with VSDOs stores light field information. The data structure with VSDOs can store other digital information, such as other types of graphical or non-graphical information.

Figure 8:
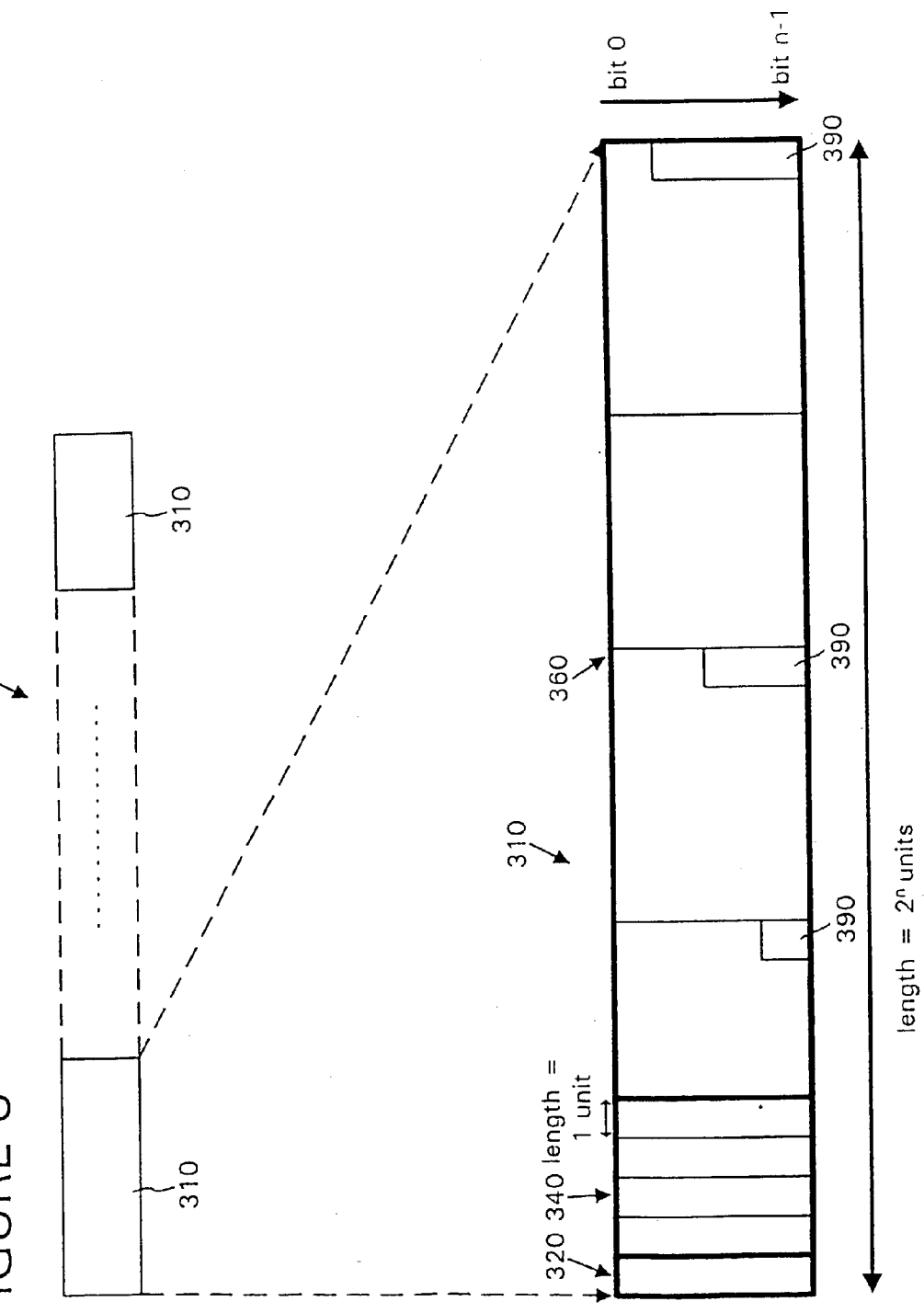
FIG. 8 is a block diagram of a data structure including packets and an illustrative packet with variable-size data objects.

With reference to FIG. 8, a data structure 300 stores digital information in a series of VSDOs in packets 310. The other data structures described in this section, e.g., data structure 800 of FIG. 19 and composite data structures, also store digital information in a series of VSDOs in packets.

FIG. 8 shows the organization of a packet 310 of the data structure 300. A packet 310 includes three fields 320, 340, and 360.

A packet begins with the reference count field 320. The reference count field 320 contains data representing a number k. As explained in detail below, during an access operation for a particular VSDO within the data structure with VSDOs, the reference count field 320 of a packet is examined to determine whether the references field 340 of the packet includes a reference to the particular VSDO being sought. The number k corresponds to the number of references to VSDOs that are stored in the references field 340 of the same packet. In FIG. 8, k is 4. Alternatively, the number k in the reference count field 320 is a cumulative number of references in the references fields 340 for the same packet and preceding packets in the data structure with VSDOs. To ensure the integrity of the data stored in the reference count field 320, the reference count field 320 can include error detection and/or error correction codes.

References field 340 follows reference count field 320. The references field 340 of a packet contains data representing references to VSDOs within the data structure with VSDOs. The references are pointers to locations of VSDOs within the data structure. Alternatively, the references are size values for VSDOs stored in the data structure or other offsets to locations of VSDOs within the data structure.

The references in the references field 340 of a packet lead to VSDOs within the data structure during access operations. As explained below with reference to FIGS. 9–13, a reference within the references field 340 of a packet can refer to a VSDO stored entirely within the same packet, split between two packets, or stored entirely within another packet. To ensure the integrity of the data stored in the references field 340, the references field 340 can contain error detection and/or error correction data.

Objects field 360 of the packet follows references field 340. The objects field 360 of a packet contains data representing at least portions of one or more VSDOs. The objects field 360 can include entire VSDOs or partial VSDOs.

As shown in FIG. 8, a packet 310 is n bits wide and can be considered a series of n-bit units. By default, n is a multiple of 8, but other values of n are possible. When n is a multiple of 8, the packet 310 is byte-aligned, which typically facilitates processing. Having a known width for the reference count 320 and references 340 fields facilitates access operations, as described below.

The length of the expanded packet shown in FIG. 8 is $2^n$ n-bit units. The default length of a packet is less than or equal to $2^n$ n-bit units, but other lengths are possible. When packet length is no greater than $2^n$ units, any unit of the packet is addressable with an n-bit address. Thus, to reference unit locations within the packet 310, each of the references in the references field 340 is a single unit long. To facilitate access at unit-indexed locations, VSDOs in the objects field 360 are padded out to the nearest n-bit unit with dummy values/null data 390. In an alternative embodiment, user data pads a VSDO to the nearest n-bit unit.

FIGS. 9–13 show a data structure 300 with packets 311–315. Although FIGS. 9–13 show the data structure 300 with five packets, the data structure 300 can include any number of packets 310 greater than or equal to 1. Further, although FIGS. 9–13 show the first four packets 311–314 of the data structure 300 to be of equal size, in an alternative embodiment, the packets of the data structure 300 are of varying size.

FIGS. 9–13 show the data structure 300 including VSDOs 361–376. VSDOs 361–376 are contained in the packets 311–315 by various configurations.

Figure 9:
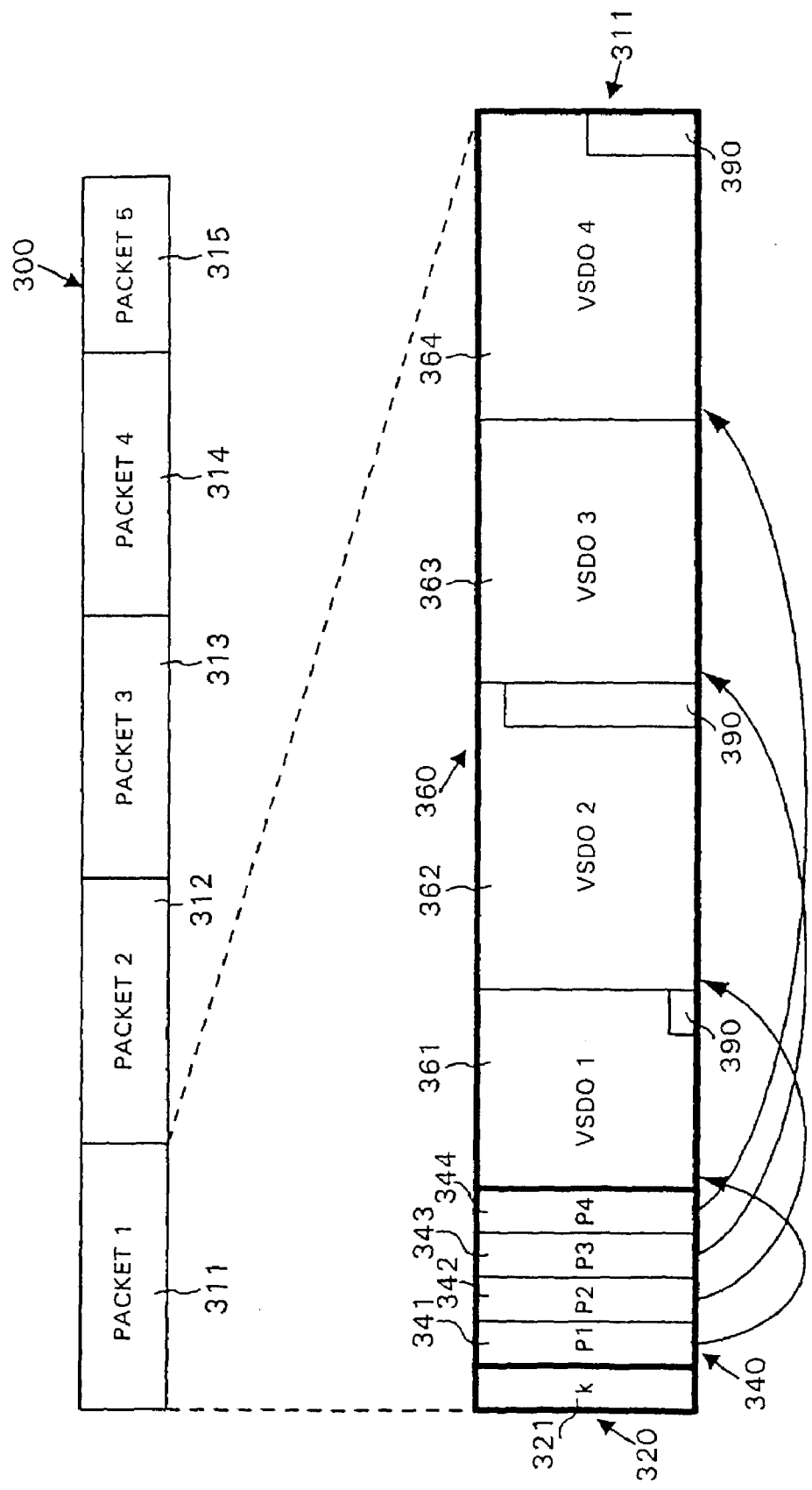
FIG. 9 is a block diagram of a data structure including packets and an illustrative packet with variable-size data objects contained entirely within the illustrative packet.

FIG. 9 shows a simple configuration of VSDOs within a packet. Packet 311 includes k references to VSDOs and entirely contains k VSDOs. The reference count field 320 of packet 311 contains a value k 321 equal to 4. The references field 340 includes 4 references 341–344. The references 341–344 lead to VSDOs 361–364, respectively, within the objects field 360 of the same packet 311. Packet 311 entirely contains the 4 VSDOs 361–364 within its objects field 360.

When packet length is no greater than $2^n$ n-bit units, at times a VSDO that is referenced in the references field 340 of a packet will not fit entirely within the objects field 360 of the same packet. If part but not all of a VSDO fits within the objects field 360 of a packet, the packet contains as much of the VSDO as possible. One or more other packets contain the remainder of the VSDO.

Figure 10:
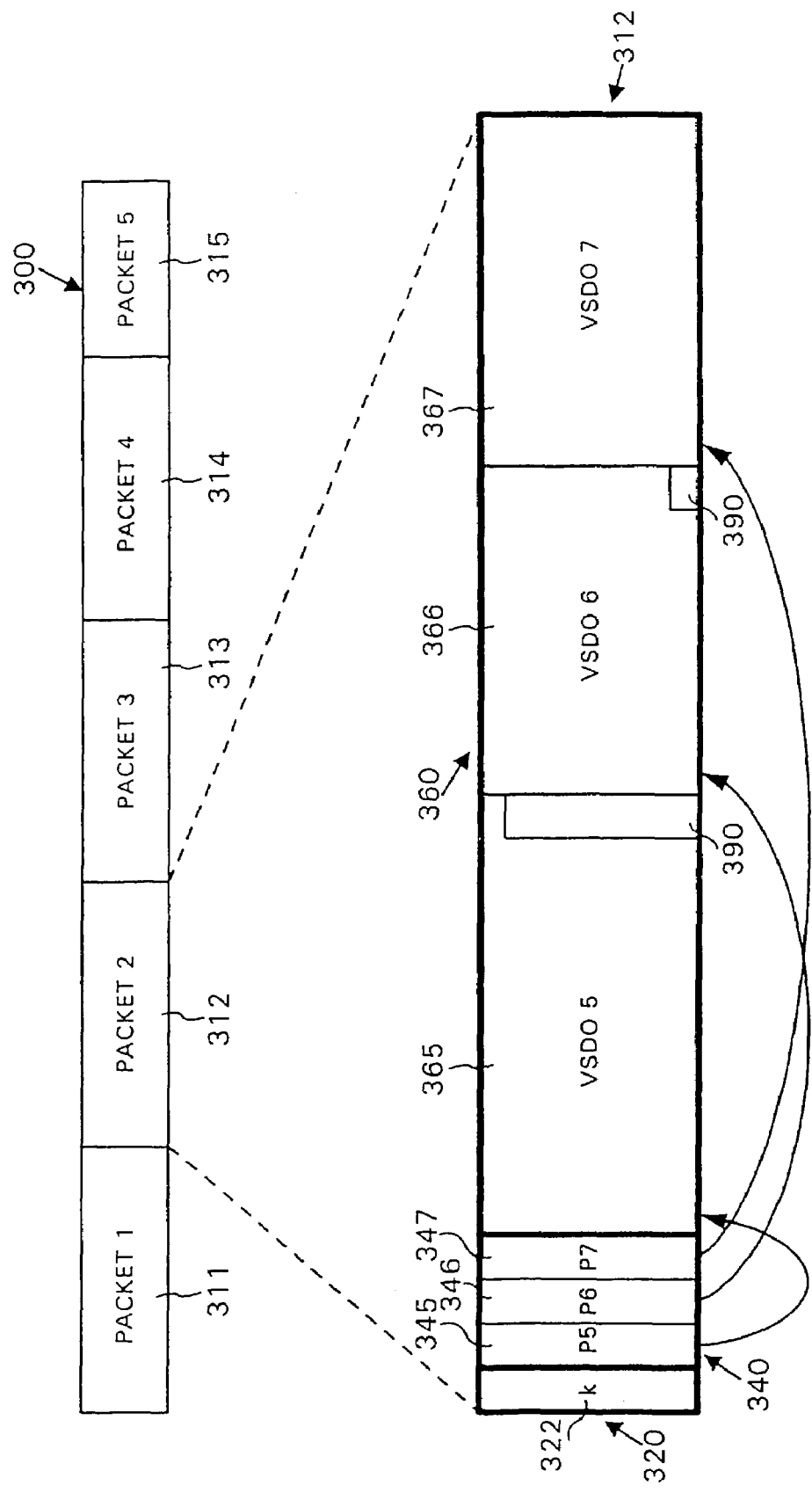
FIG. 10 is a block diagram of a data structure including packets and an illustrative packet with the beginning portion of a split variable-size data object.
Figure 11:
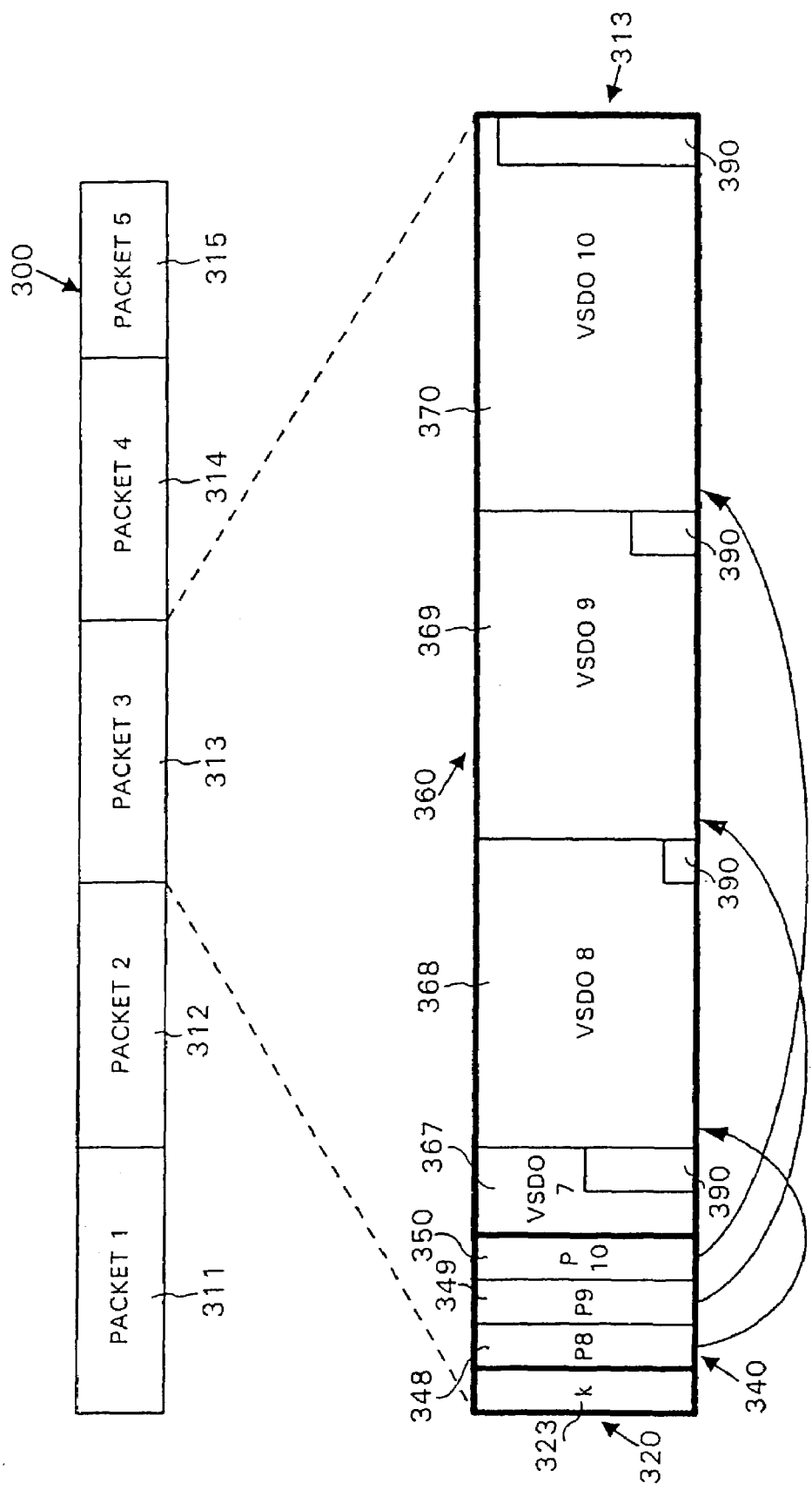
FIG. 11 is a block diagram of a data structure including packets and an illustrative packet with the terminal portion of the split variable-size data object of FIG. 10.

FIGS. 10 and 11 show a VSDO split between two packets. Packet 312 has k references to VSDOs and entirely contains k-1 VSDOs. Packet 312 further contains the beginning portion of another VSDO. The reference count field 320 of packet 312 contains a value k 322 equal to 3. The references field 340 of packet 312 includes 3 references 345–347. References 345–346 lead to VSDOs 365–366, respectively, which are entirely contained within the objects field 360 of the same packet 312. Reference 347 leads to VSDO 367, which is partially contained within the objects field 360 of the same packet 312. The remaining portion of VSDO 367 is contained at the beginning of the objects field 360 of subsequent packet 313. Although packet 313 contains part of VSDO 367, the references field 340 of packet 313 does not contain a reference to VSDO 367. Moreover, the value k 323 in the reference count field 320 of packet 313 does not include VSDO 367. Instead, only the reference count and references fields of the packet in which VSDO 367 begins, packet 312, reference VSDO 367.

When packet length is no greater than $2^n$ n-bit units, at times none of a VSDO that is referenced in the references field 340 of a packet will fit within the objects field 360 of the same packet. If none of a VSDO fits within the objects field 360 of a packet, the objects fields 360 of one or more other packets contain the VSDO.

Figure 12:
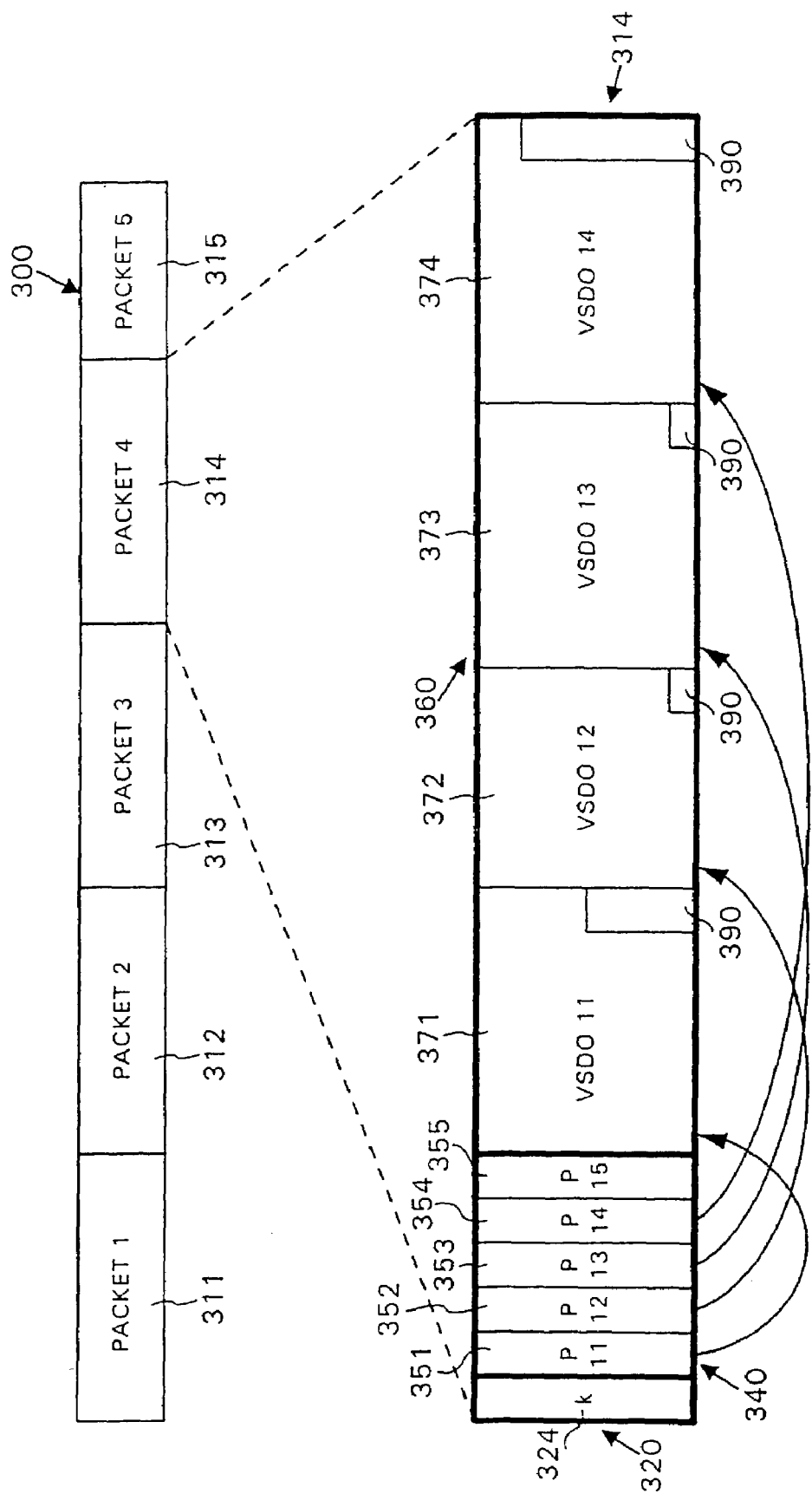
FIG. 12 is a block diagram of a data structure including packets and an illustrative packet with a reference to a variable-size data object that is entirely contained within the illustrative packet of FIG. 13.
Figure 13:
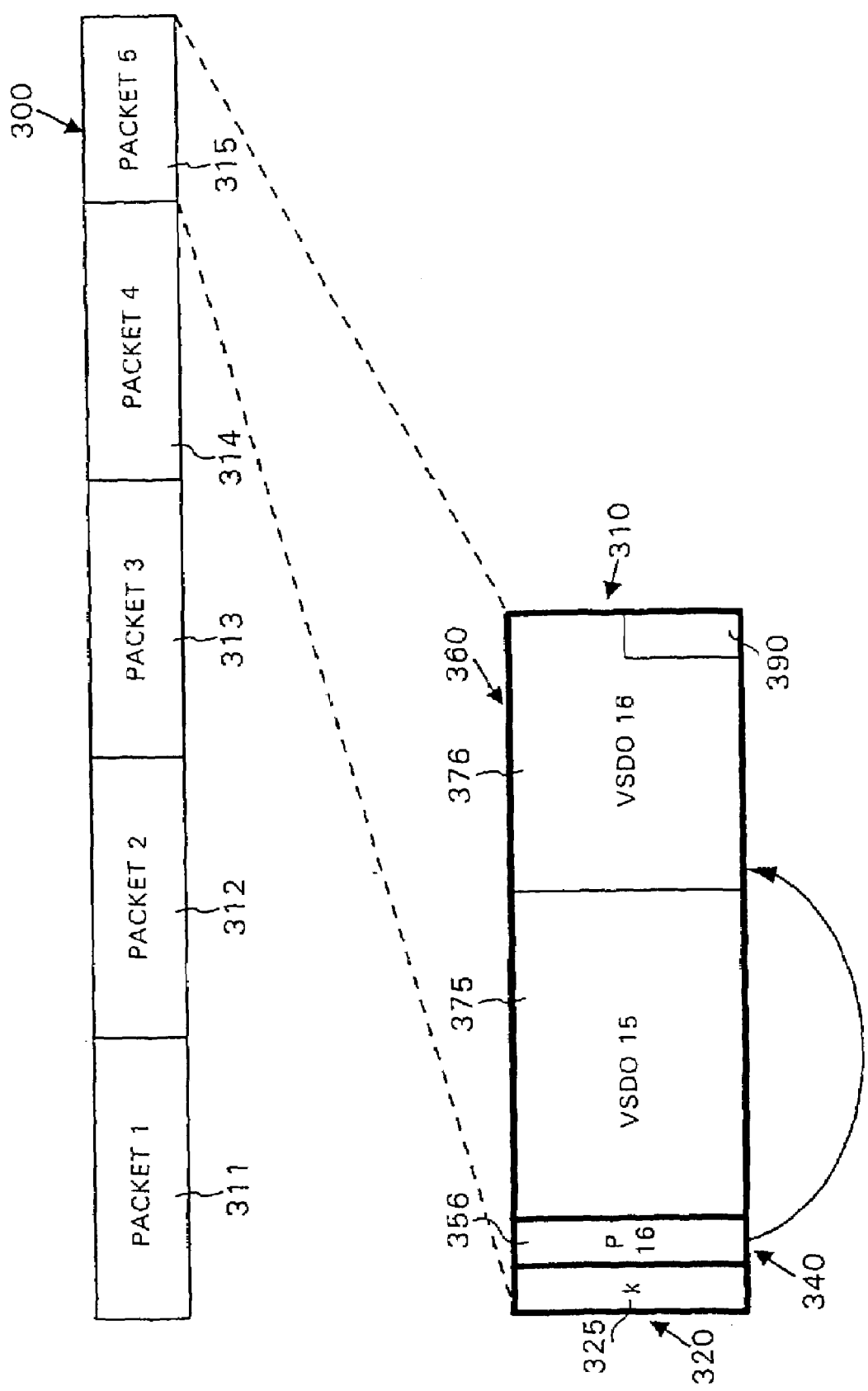
FIG. 13 is a block diagram of a data structure including packets and an illustrative truncated packet with a variable-size data object referenced within the illustrative packet of FIG. 12.

FIGS. 12 and 13 show a VSDO that is referenced in one packet and entirely contained in another packet. Packet 314 includes k references to VSDOs and entirely contains k-1 VSDOs. Packet 314 contains none of the $k^{th}$ VSDO. The reference count field 320 of packet 314 contains a value k 324 equal to 5. The references field 340 of packet 314 includes 5 references 351–355. References 351–354 lead to VSDOs 371–374, respectively, which are entirely contained within the objects field 360 of the same packet 314. Reference 355 contains a special code indicating the VSDO 375 associated with reference 355 is contained in another packet. In FIGS. 12 and 13, the special code is a null value and the other packet is subsequent packet 315. VSDO 375 is contained at the beginning of the objects field 360 of subsequent packet 315. Although packet 315 contains VSDO 375, the references field 340 of packet 315 does not contain a reference to VSDO 375. Moreover, the value k 325 in the reference count field 320 of packet 315 does not include VSDO 375. Instead, only the reference count and references fields 340 of packet 314 reference VSDO 375.

If a packet contains a last VSDO of a series of VSDOs, and the packet has remaining space in its objects field 360 after the last VSDO, the packet is truncated following the n-bit unit that contains the last portion of the last VSDO. In FIG. 13, packet 315 is truncated after the last unit containing part of VSDO 376. Alternatively, other data fills out the remainder of a packet.

FIGS. 9–13 show various configurations by which packets contain VSDOs. Although FIGS. 9–13 present these configurations in a certain order, FIGS. 9–13 are not meant to limit the ways in which the various illustrated configurations can be arranged, combined, or otherwise practiced.

Operations Involving the Exemplary Data Structure
Filling a Packet with VSDOs

Figure 14:
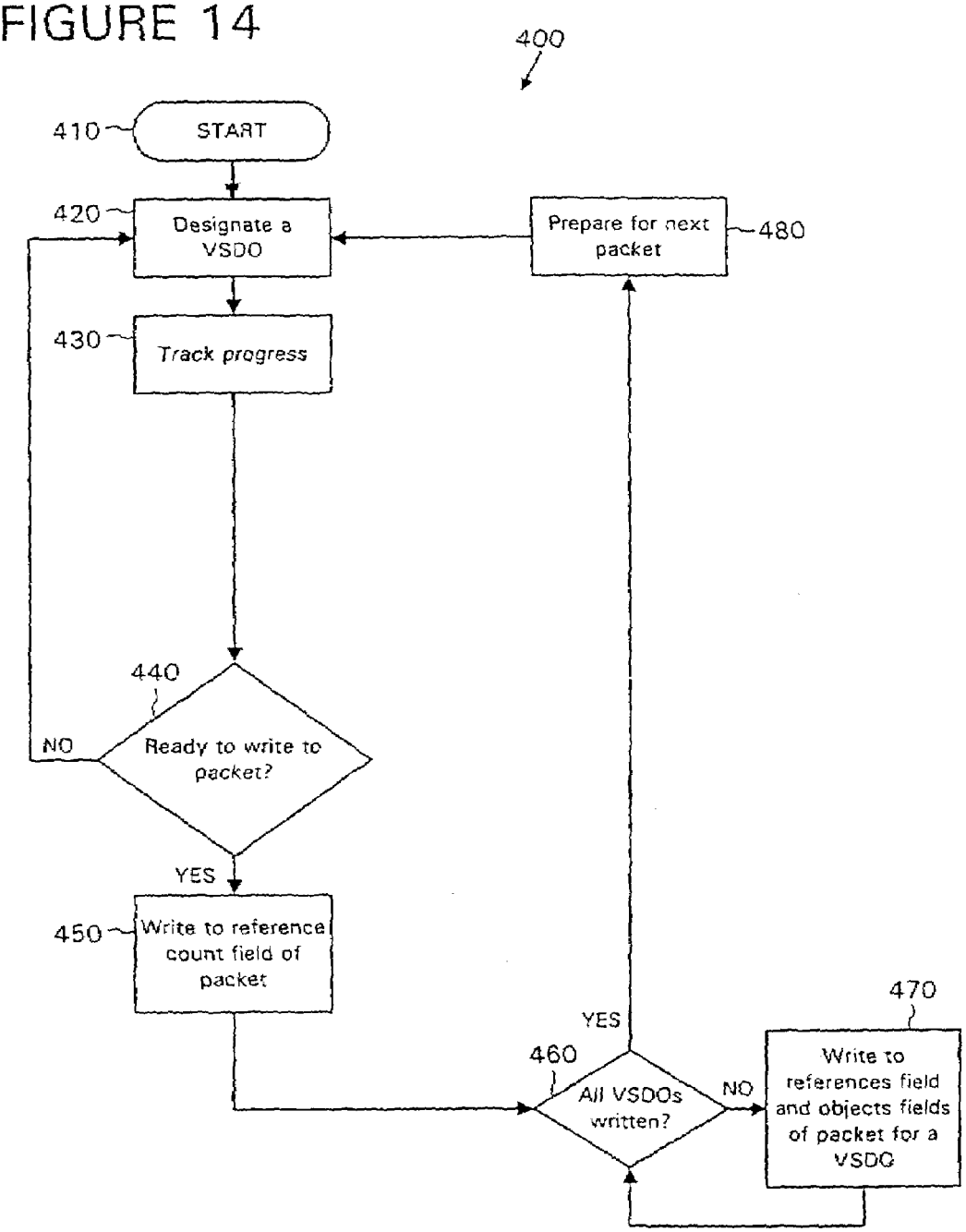
FIG. 14 is a flowchart showing a technique for filling a packet with variable-size data objects.

FIG. 14 shows a technique 400 for filling packets of a data structure 300 with VSDOs. VSDOs are iteratively processed until enough VSDOs have been processed to fill a packet. The packet is then filled. To simplify presentation of the technique 400, the acts of the technique are described as performed by a packetizing unit. The packetizing unit can be any functional operator or combination of functional operators in a computer system, and is not limited to any particular software or hardware implementation. For example, the packetizing unit can be software running on a general purpose computer, a hardware or software packet assembler/disassembler (PAD), or some other digital signal processor.

After the start (act 410) of technique 400, the packetizing unit designates (act 420) a VSDO for processing. For example, if a buffer stores VSDOs that are ready for placement in a packet of the data structure 300, the packetizing unit iteratively processes VSDOs that are queued in the buffer.

The packetizing unit tracks (act 430) progress towards the point at which VSDOs will be written to the packet. For example, the packetizing unit increments a count that tracks the cumulative number of designated VSDOs for the packet to be filled. The packetizing unit updates a cumulative size value. The cumulative size value tracks (e.g., in bytes) the cumulative size of the designated VSDOs plus the space needed for references to those designated VSDOs within the references field of a packet. Alternatively, the packetizing unit utilizes a different system of counts and cumulative values to track (act 430) progress towards the point at which VSDOs will be written to the packet.

The packetizing unit determines (act 440) whether it has processed enough VSDOs to begin writing to the packet. If the packetizing unit has not processed enough VSDOs to fill the packet, the packetizing unit returns to designate (act 420) a subsequent VSDO. On the other hand, if enough VSDOs have been processed to fill the packet, the packetizing unit proceeds to fill the packet. For example, a packet size threshold value can indicate the amount of space in the packet to be filled. By comparing a cumulative size value of processed VSDOs to the packet size threshold, the packetizing unit determines whether enough VSDOs have been processed to fill the packet. Alternatively, the packetizing unit uses other tests to determine (act 440) whether to begin writing VSDOs to the packet.

To fill the packet, the packetizing unit writes (act 450) a value to the reference count field 320 of the packet. For example, the packetizing unit writes a count that tracks the cumulative number of designated VSDOs to the reference count field 320 of the packet.

The packetizing unit then writes (acts 460, 470) processed VSDOs to the references field 340 and objects field 360 of the packet. For example, the packetizing unit first reserves space in the references field 340 of the packet for the references for designated VSDOs. For single unit references, the packetizing unit reserves one unit of space for each VSDO reference that will be written to the packet. As long as there remains a VSDO to be written (act 460) to the packet, the packetizing unit continues to write to the packet. The packetizing unit selects an unwritten VSDO and writes a reference for the VSDO to the references field 340 of the packet. The packetizing unit then writes the VSDO to the objects field 360 of the packet. If the packet runs out of space before all of the VSDO is written to the objects field 360 of the packet, the packetizing unit writes as much of the VSDO as possible to the objects field 360 and reserves the remainder of the unwritten VSDO. In an alternative embodiment, the packetizing unit performs other acts to write (act 470) processed VSDOs to the references field 340 and objects field 360 of the packet.

When the packetizing unit has written all VSDOs to the packet or filled the packet, the packetizing unit prepares (act 480) to write VSDOs to the next packet. For example, the packetizing unit adjusts the cumulative size value to account for entirely and partially written VSDOs. The packetizing unit also initializes the count that tracks designated VSDOs and determines a new packet to be filled. In an alternative embodiment, the packetizing unit prepares (act 480) to fill a new packet with any necessary adjustment of counts and variables used in the filling technique.

The packetizing unit can check at act 440, 480, or other stages whether there are any more VSDOs to be written to packets. If there are no more VSDOs to write, the packetizing unit writes any processed VSDOs to a packet and terminates. Alternatively, the packetizing unit can wait at act 480 or other stages until another VSDO is received.

In alternative embodiments, the packetizing unit reorders the above acts without changing the ultimate results of the techniques. For example, the packetizing unit reorders the described constituent acts of tracking progress, writing to packets, or preparing for a next packet.

Accessing a VSDO within the Data Structure

Figure 15:
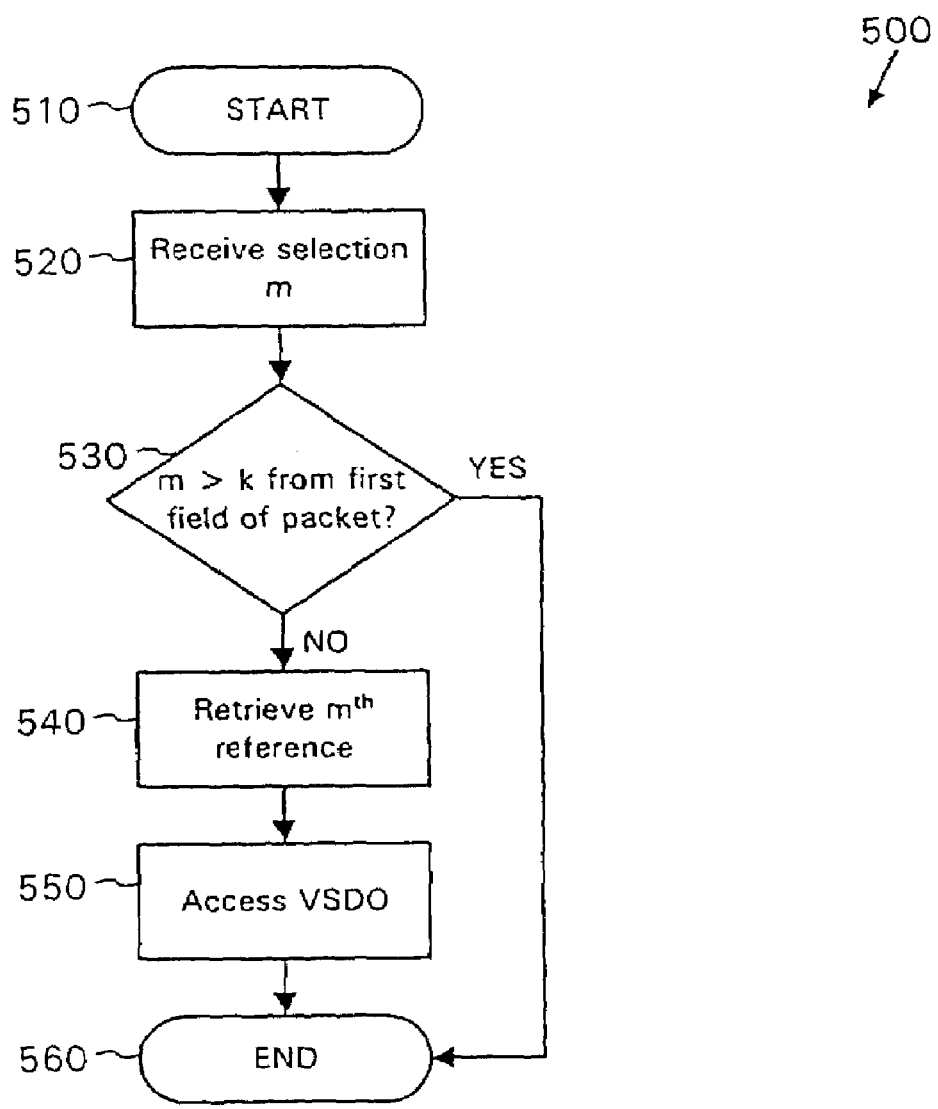
FIG. 15 is a flowchart showing a technique for accessing a variable-size data object within a data structure with a single packet.
Figure 16:
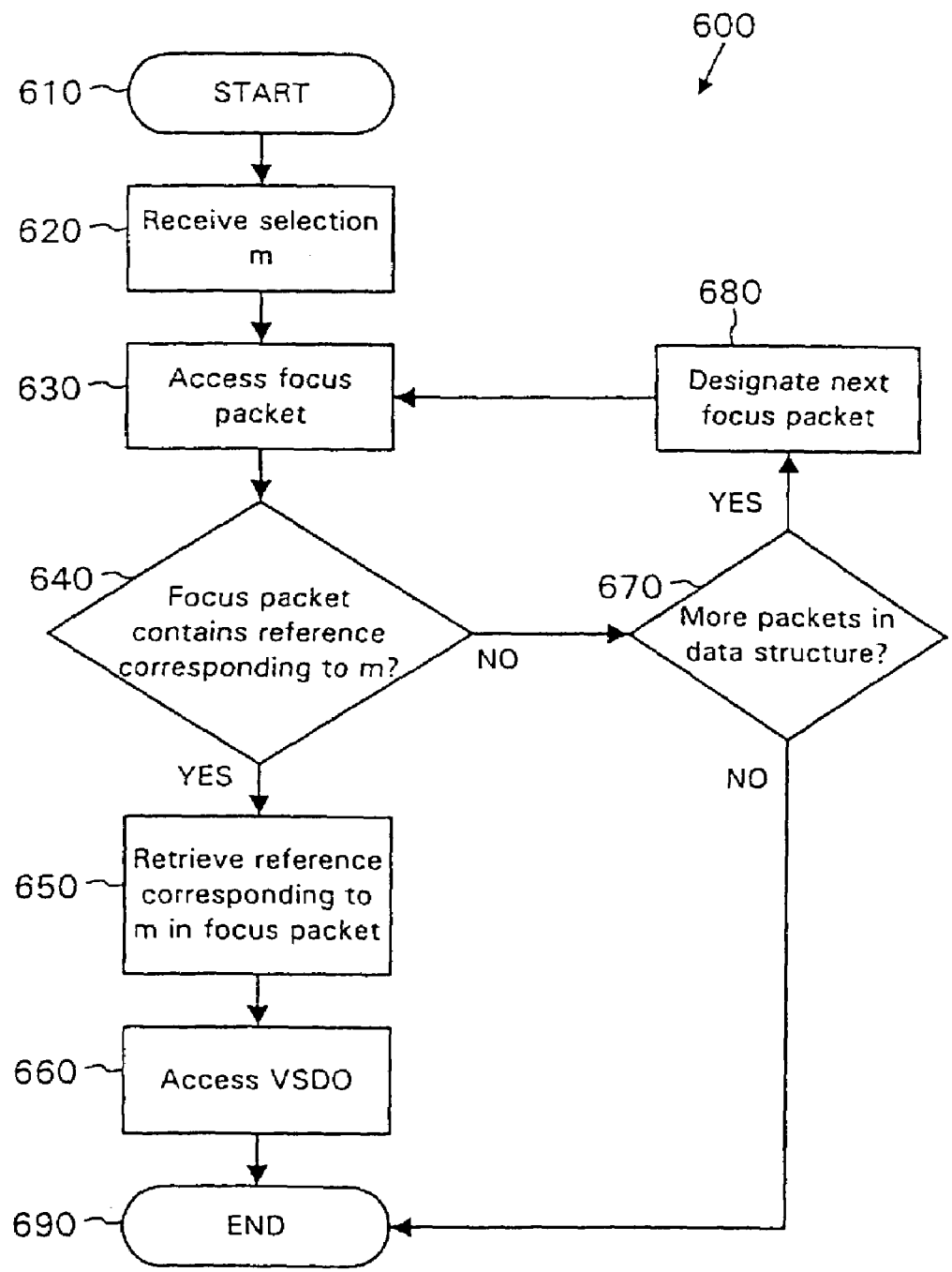
FIG. 16 is a flowchart showing a technique for accessing a variable-size data object within a data structure with multiple packets.
Figure 17:
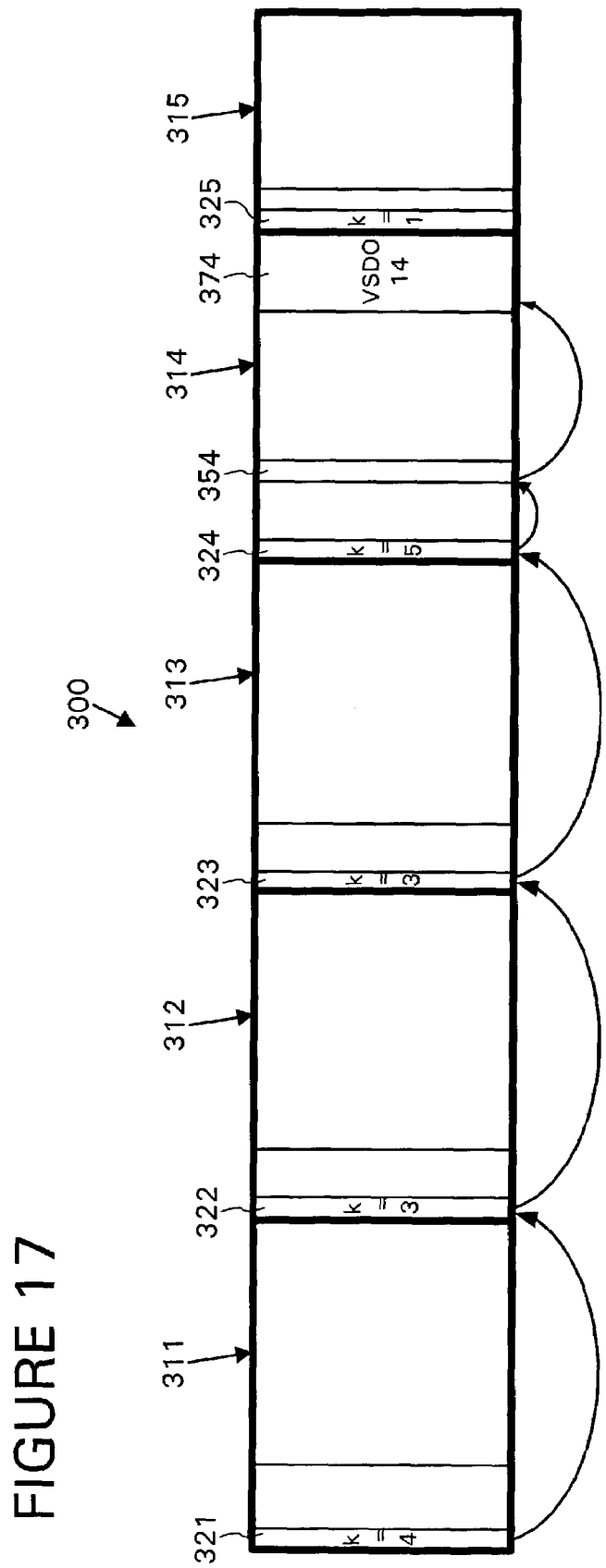
FIG. 17 is a block diagram showing the accessing of a variable-size data object within the data structure of FIGS. 9–13.

FIG. 15 shows a technique 500 for accessing a VSDO within a data structure with a single packet. FIG. 16 shows a technique 600 for accessing a VSDO within a data structure with multiple packets. FIG. 17 shows an accessing operation for a VSDO within the-data structure of FIGS. 9–13.

To simplify presentation of the above techniques, acts are described as performed by an accessing unit. The accessing unit can be any functional operator or combination of functional operators in a computer system, and is not limited to any particular software or hardware implementation.

FIG. 15 shows a technique 500 for accessing a VSDO within a data structure 300 with a single packet. After starting (act 510), the accessing unit receives (act 520) a numerical selection m that corresponds to a reference and VSDO within the data structure 300. The accessing unit determines (act 530) whether the packet of the data structure contains a reference and VSDO corresponding to numerical selection m. For example, the accessing unit compares numerical selection m to the value k in the reference count field 320 of the packet. If m is greater than k, the packet does not contain the reference to the VSDO being sought, and the accessing unit terminates (act 560) the access operation. If m is less than or equal to k, the accessing unit retrieves (act 540) the $m^{th}$ reference from the references field 340 of the packet. The accessing unit then accesses the corresponding VSDO using the $m^{th}$ reference. Thus, the accessing unit efficiently retrieves the VSDO being sought without accessing preceding VSDOs. After accessing the VSDO, the accessing unit terminates (act 560) the access operation.

FIG. 16 shows a technique 600 for accessing a VSDO within a data structure 300 with multiple packets.

The accessing unit receives (act 620) a numerical selection m that corresponds to a reference and VSDO within the data structure 300. The accessing unit selects a packet in the data structure 300 to be the focus of processing and accesses (act 630) the focus packet. For example, the focus packet is initially the first packet in the data structure 300.

Based upon the value k in the reference count field 320 of the focus packet, the accessing unit determines (act 640) whether the focus packet contains a reference corresponding to numerical selection m. If the focus packet contains a reference corresponding to numerical selection m, the accessing unit performs acts 650, 660 to access the VSDO corresponding to numerical selection m, as described below. Otherwise, the accessing unit performs acts 670, 680 to check another packet in the data structure 300, as described below.

For example, before initially accessing a focus packet, the accessing unit can initialize a count that tracks the cumulative number of references in focus packets considered by the accessing unit. After accessing (act 630) a focus packet, the accessing unit adds the value k of the reference count field 320 of the focus packet to the cumulative reference count. To determine whether the focus packet contains a reference corresponding to numerical selection m, the accessing unit compares m to the cumulative reference count. If m is less than or equal to the cumulative reference count, the accessing unit performs acts 650, 660 to access the VSDO corresponding to numerical selection m. Otherwise, the accessing unit performs acts 670, 680 to check another packet in the data structure 300.

Alternatively, the accessing unit utilizes a different type of count to determine whether the focus packet contains a reference corresponding to numerical selection m. The accessing unit compares numerical selection m to the value k in the reference count field 320 of the focus packet. If m is less than or equal to k, the accessing unit performs acts 650, 660 to access the VSDO corresponding to m. If m is greater than k, the accessing unit decrements m by k and performs acts 670, 680 to check another packet in the data structure. By decrementing m by the value k from the reference count field of the focus packet, the accessing unit adjusts m for the remaining packets of the data structure.

Alternatively, the value k in the reference count field of the focus packet is a cumulative reference count value that indicates the number of references in the focus packet and preceding packets. During an access operation, the accessing unit compares numerical selection m to the cumulative reference count to determine (act 640) whether the focus packet contains a reference corresponding to numerical selection m. In other alternative embodiments, the accessing unit utilizes other techniques to determine whether the focus packet contains a reference corresponding to numerical selection m.

If the accessing unit determines (act 640) that the focus packet contains a reference corresponding to numerical selection m, the accessing unit retrieves (act 650) the reference corresponding to numerical selection m from the references field 340 of the focus packet. In one embodiment, references to VSDOs are pointers to VSDOs. Based upon numerical selection m and the known size of each reference (e.g., one unit), the accessing unit retrieves the pointer to the VSDO corresponding to numerical selection m.

Based upon the retrieved reference, the accessing unit accesses (act 660) in the data structure the VSDO corresponding to numerical selection m. The accessing unit accesses any portion of the VSDO that the focus packet contains. If any portion of the VSDO is contained in another packet, the accessing unit accesses that portion of the VSDO in the other packet. After accessing the VSDO, the accessing unit terminates (act 690) the access operation. When references to VSDOs are pointers, the accessing unit uses a retrieved pointer to reach the VSDO being sought. If the retrieved pointer is non-null, the accessing unit uses it to reach parts of the VSDO in the focus packet. If the retrieved pointer is a null pointer, the accessing unit retrieves the VSDO starting in another packet.

If the focus packet does not contain a reference corresponding to numerical selection m, the accessing unit determines (act 670) whether the data structure contains any more packets. If the data structure does not contain any more packets, the accessing unit terminates (act 690) the access operation. If the data structure contains more packets, the accessing unit designates (act 680) another packet as the focus packet and repeats.

In alternative embodiments, the accessing unit reorders the above acts without changing the ultimate results of the techniques.

FIG. 17 shows the accessing of a VSDO in the data structure 300 of FIGS. 9–13. Packet 314 contains VSDO 14 (374), which is the VSDO to be accessed in FIG. 17.

The access operation begins with consideration of packet 311. The value k 321 in the reference count field 320 of packet 311 is 4. Because this value k 321 is less than 14 (the number of the object to be accessed), the access operation continues with packet 312.

The value k 322 of packet 312 is 3. The cumulative value of the reference count fields 320 is now 7. Because this cumulative value is less than 14, the access operation continues with packet 313.

The value k 323 of packet 313 is 3. The cumulative value of the reference count fields 320 is now 10. Because this cumulative value is less than 14, the access operation continues with packet 314.

The value k 324 of packet 314 is 5. The cumulative value of the reference count fields 320 is now 15. Because this cumulative value is greater than 14, packet 314 contains a reference for VSDO 14 (374). Reference 354 in the references field 340 of packet 315 refers to VSDO 14 (374). Reference 354 is retrieved. VSDO 14 (374) is accessed based upon reference 354.

As shown in this example, VSDO 14 (374) is retrieved without having to access, decode, or otherwise process the preceding VSDOs in the data structure. Moreover, VSDO 14 (374) is efficiently retrieved without processing the references in the references fields of preceding packets in the data structure. The data structure 300 facilitates selective, rapid access to portions of a large data stream, even when the selectively accessed portions of the data stream are variable-size. Thus, for example, the data structure with VSDOs allows efficient, rapid, selective access even for variable-length, compressed information. Further, if a particular VSDO in an objects field is corrupted or otherwise lost, access to subsequent VSDOs is not necessarily prevented.

Serializing and Transmitting the Exemplary Data Structure

Figure 18:
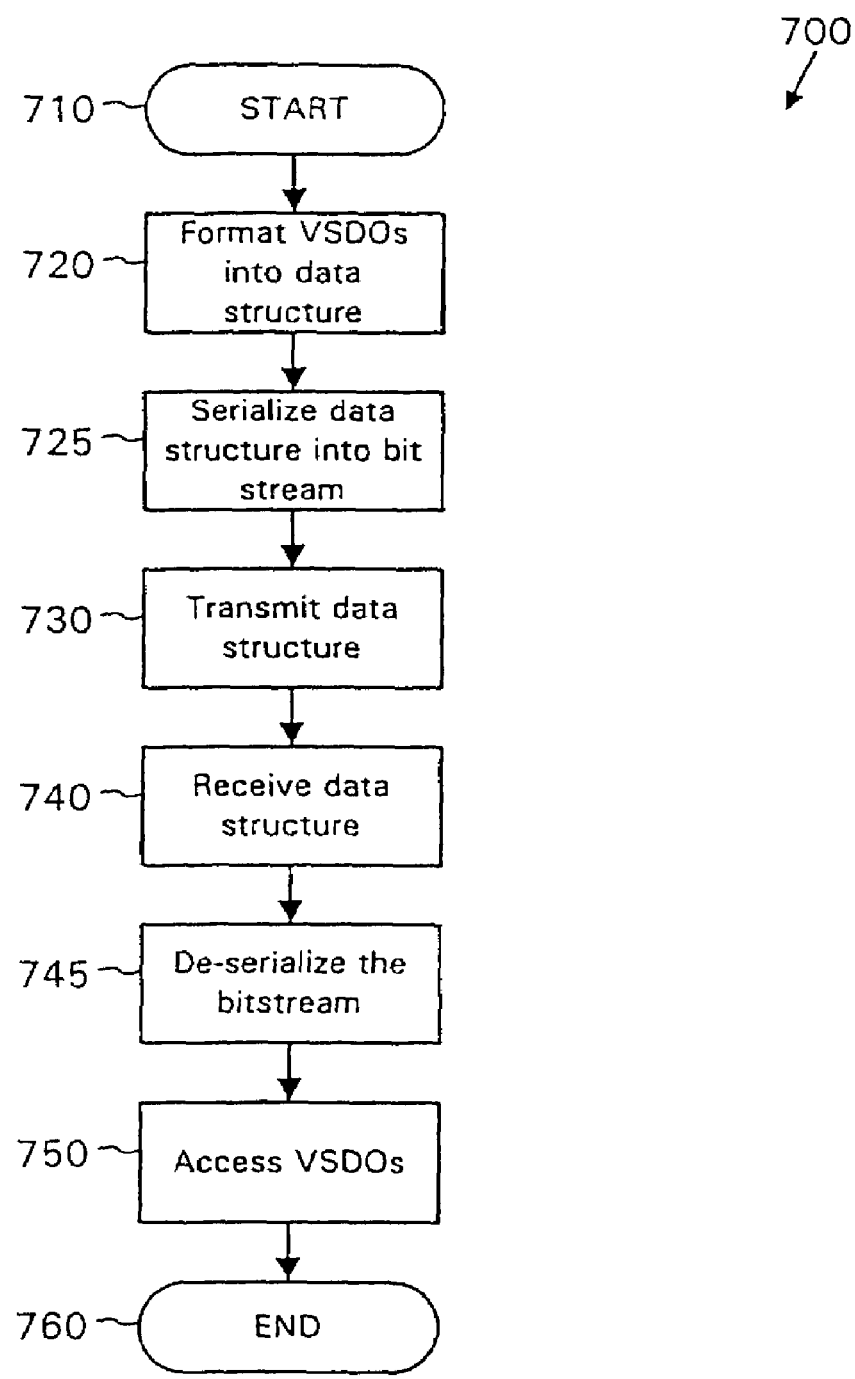
FIG. 18 is a flowchart showing a technique for transmission and reception of a data structure with variable-size data objects.

FIG. 18 shows a technique 700 for transmitting and receiving a data structure with VSDOs. A transmitter transmits the data structure over a transmission medium to a receiver that accesses VSDOs within the data structure.

To simplify presentation of the technique 700, certain acts are described as performed by a transmitter or a receiver. The transmitter and the receiver can be any functional operators or combinations of functional operators in a computer system, and are not limited to any particular software or hardware implementation. For example, the transmitter/receiver combination can be implemented as a server/client system in a distributed computing environment, a broadcaster/set-top box or hand-held device system, a peer to peer conferencing system, or as any computer-based system.

The transmitter formats (act 720) VSDOs into a data structure with VSDOs, e.g., by one of the described techniques for filling a data structure with VSDOs. The transmitter serializes (act 725) the data structure into a bit stream that is more readily transmitted over a transmission medium. The transmitter then transmits (act 730) the data structure over a transmission medium to a receiver. The receiver receives (act 740) the transmitted data structure. The receiver de-serializes (act 745) the bit stream and recreates the data structure with VSDOs. The receiver then accesses (act 750) VSDOs within the data structure, e.g., by one of the described access techniques.

Hierarchical Organization with the Exemplary Data Structure

Figure 19:
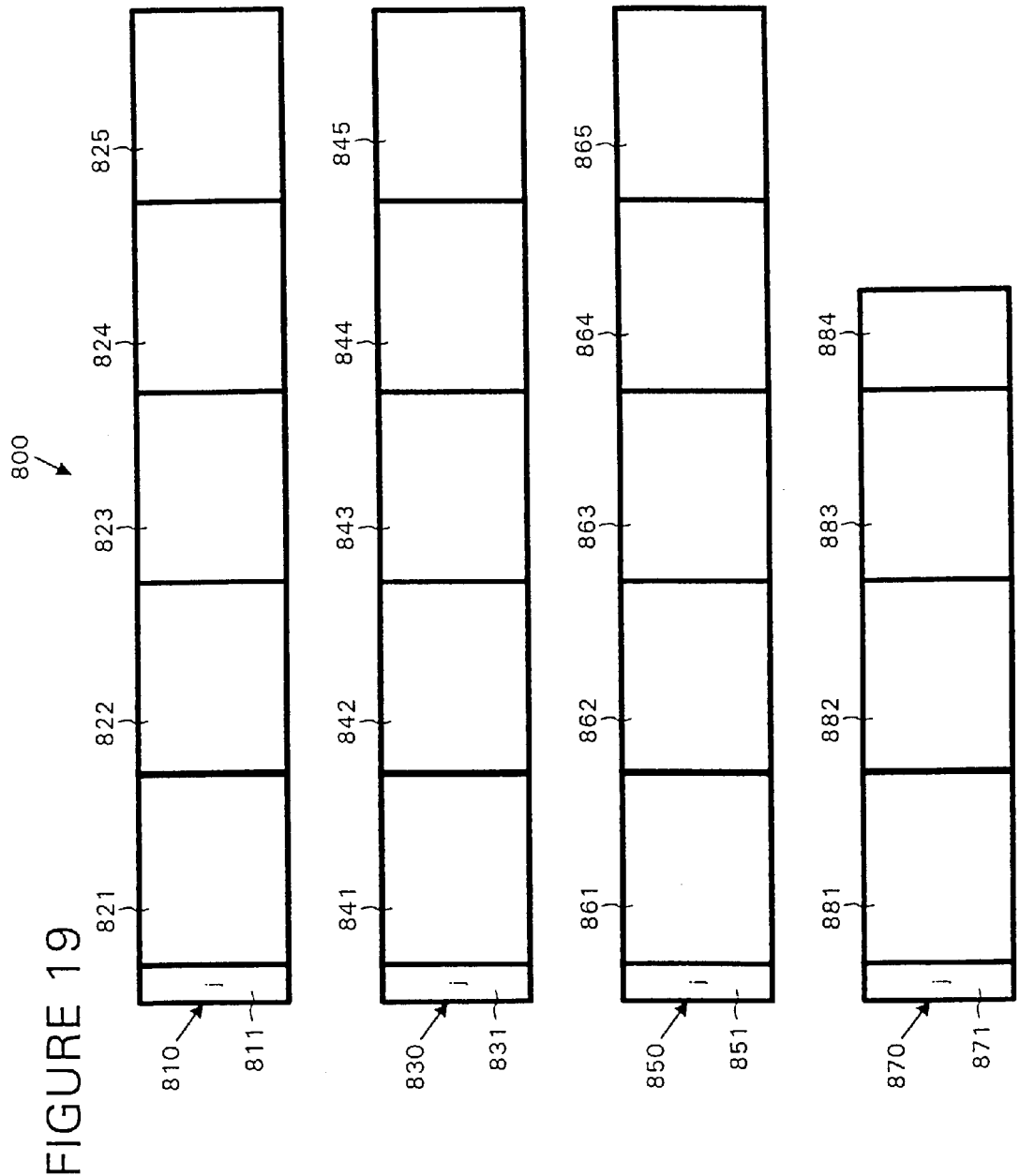
FIG. 19 is a block diagram showing a hierarchically organized data structure with variable-size data objects.

With reference to FIG. 19, a hierarchically organized data structure 800 stores digital information as a series of VSDOs in metapackets. The hierarchically organized data structure 800 organizes VSDOs into one or more metapackets to improve the efficiency of access operations.

To simplify presentation, FIG. 19 depicts the hierarchically organized data structure 800 as a group of separate metapackets. The arrangement of metapackets within the hierarchically organized data structure 800 is not limited by this depiction. For example, metapackets within the hierarchically organized data structure 800 can be arranged in an end-to-end, contiguous manner. The hierarchically organized data structure 800 can be implemented as one or more data structures 300 with metapacket headers.

A hierarchically organized data structure 800 can include any number of metapackets. In FIG. 19, hierarchically organized data structure 800 includes four metapackets 810, 830, 850, 870.

A metapacket includes a metapacket header j and one or more packets, e.g., packet 310. Metapackets 810, 830, 850, 870 include metapacket headers 811, 831, 851, 871, respectively. A metapacket header j relates to the total number of VSDOs referenced within the metapacket. For example, the metapacket header j is equal to the sum of the reference count field values k of the packets within the metapacket. To access a VSDO in the hierarchically organized data structure 800, the metapacket header j of a metapacket is examined to determine whether a references field 340 of a packet within the metapacket includes a reference to the VSDO-to-be-accessed.

FIG. 19 depicts equal-size metapackets 810, 830, 850, each of which includes five equal-size packets 821–825, 841–845, 861–865. Metapacket 870 includes the final VSDOs of a series of VSDOs and is smaller than the other metapackets. Alternatively, metapackets within a hierarchically organized data structure can be variable-size, can include different numbers of packets, or can include packets of different sizes.

Filling a Metapacket of the Hierarchically Organized Data Structure

To fill a metapacket of a hierarchically organized data structure 800, the techniques for filling packets 310 of a data structure 300 with VSDOs are modified. One of these techniques is followed until a metapacket threshold is reached. The metapacket threshold relates to the size of a metapacket, the number of packets within a metapacket, the number of VSDOs referenced within a metapacket, or some other consideration. When the metapacket threshold is reached, the metapacket ends. A metapacket also ends when a final VSDO in a series of VSDOs is reached. A metapacket header j is calculated from the reference count fields of the packets within the metapacket. The filling of a new metapacket then begins, if necessary.

Figure 20:
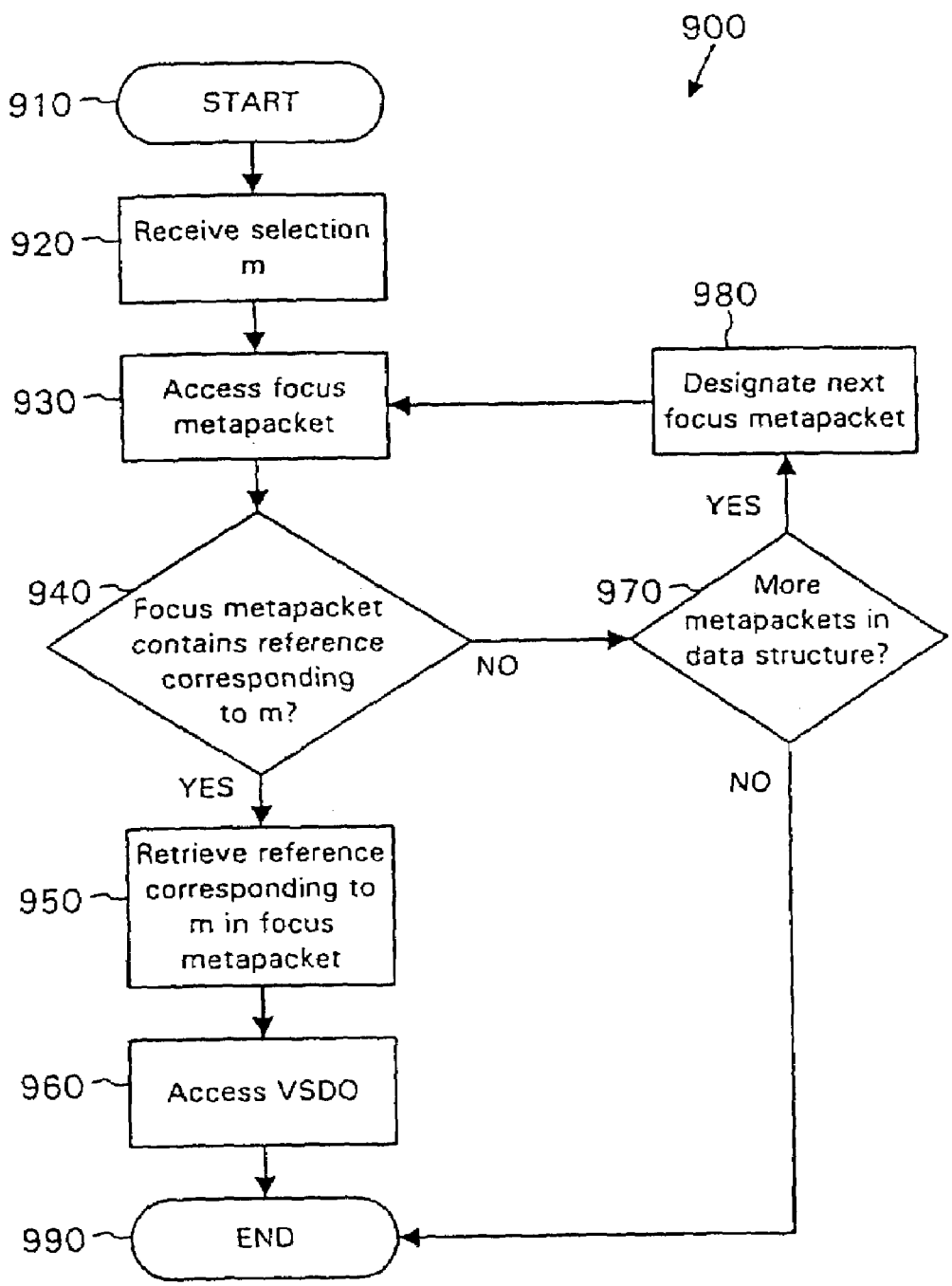
FIG. 20 is a flowchart showing a technique for accessing a variable-size data object within a hierarchically organized data structure with multiple metapackets.

Accessing a VSDO within a Metapacket of the Hierarchically Organized Data Structure FIG. 20 shows a technique 900 for accessing a VSDO within a hierarchically organized data structure with multiple metapackets. FIG. 2521 shows an accessing operation for a VSDO within the hierarchically organized data structure 800 of FIG. 19.

An accessing unit receives (act 920) a numerical selection m that corresponds to a reference and VSDO within the hierarchically organized data structure. The accessing unit selects a metapacket in the hierarchically organized data structure to be the focus of processing. The accessing unit accesses (act 930) this focus metapacket. For example, the focus metapacket is initially the first metapacket in the hierarchically organized data structure.

Based upon the value j in the header of the focus metapacket, the accessing unit determines (act 940) whether the focus metapacket contains a reference corresponding to numerical selection m. If the focus metapacket contains a reference corresponding to numerical selection m, the accessing unit performs acts 950, 960 to access the VSDO corresponding to numerical selection m, as described below. Otherwise, the accessing unit performs acts 970, 980 to check another metapacket in the hierarchically organized data structure, as described below.

For example, before initially accessing a focus metapacket, the accessing unit initializes a count that tracks the cumulative header values of focus metapackets considered by the accessing unit. After accessing (act 930) a focus metapacket, the accessing unit adds the value j of the header in the focus metapacket to the cumulative header value count. To determine whether the focus metapacket contains a reference corresponding to numerical selection m, the accessing unit compares m to the cumulative header value count. If m is less than or equal to the cumulative header value count, the accessing unit performs acts 950, 960 to access the VSDO corresponding to numerical selection m. Otherwise, the accessing unit performs acts 970, 980 to check another metapacket in the hierarchically organized data structure.

Alternatively, the accessing unit utilizes a different type of counter to determine whether the focus metapacket contains a reference corresponding to numerical selection m. The accessing unit compares numerical selection m to the value j in the header of the focus metapacket. If m is less than or equal to j, the accessing unit performs acts 950, 960 to access the VSDO corresponding to m. If m is greater than j, the accessing unit decrements m by j and performs acts 970, 980 to check another metapacket in the data structure 800. By decrementing m by the value j from the header of the focus metapacket, the accessing unit adjusts m for the remaining metapackets of the hierarchically organized data structure.

Alternatively, the value j in the header of the focus metapacket is a cumulative header value that indicates the number of references in the focus metapacket and preceding metapackets. During an access operation, the accessing unit compares numerical selection m to the cumulative header value to determine (act 940) whether the focus metapacket contains a reference corresponding to numerical selection m. In other alternative embodiments, the accessing unit utilizes other techniques to determine whether the focus metapacket contains a reference corresponding to numerical selection m.

If the accessing unit determines (act 940) that the focus metapacket contains a reference corresponding to numerical selection m, the accessing unit retrieves (act 950) the reference corresponding to numerical selection m from a references field 340 of a packet within the focus metapacket. Based upon the retrieved reference, the accessing unit accesses (act 960) in the hierarchically organized data structure the VSDO corresponding to numerical selection m. For example, variations of technique 600 can be used to retrieve a reference from a references field of a packet within the focus metapacket and access the VSDO that is sought. The accessing unit then terminates (act 990) the access operation.

If the focus metapacket does not contain a reference corresponding to numerical selection m, the accessing unit determines (act 970) whether the hierarchically organized data structure contains any more metapackets. If the hierarchically organized data structure contains more metapackets, the accessing unit designates (act 980) another metapacket as the focus metapacket and repeats. Otherwise, the accessing unit terminates (act 990) the access operation.

In alternative embodiments, the accessing unit reorders the above acts without changing the ultimate results of the technique 900.

Figure 21:
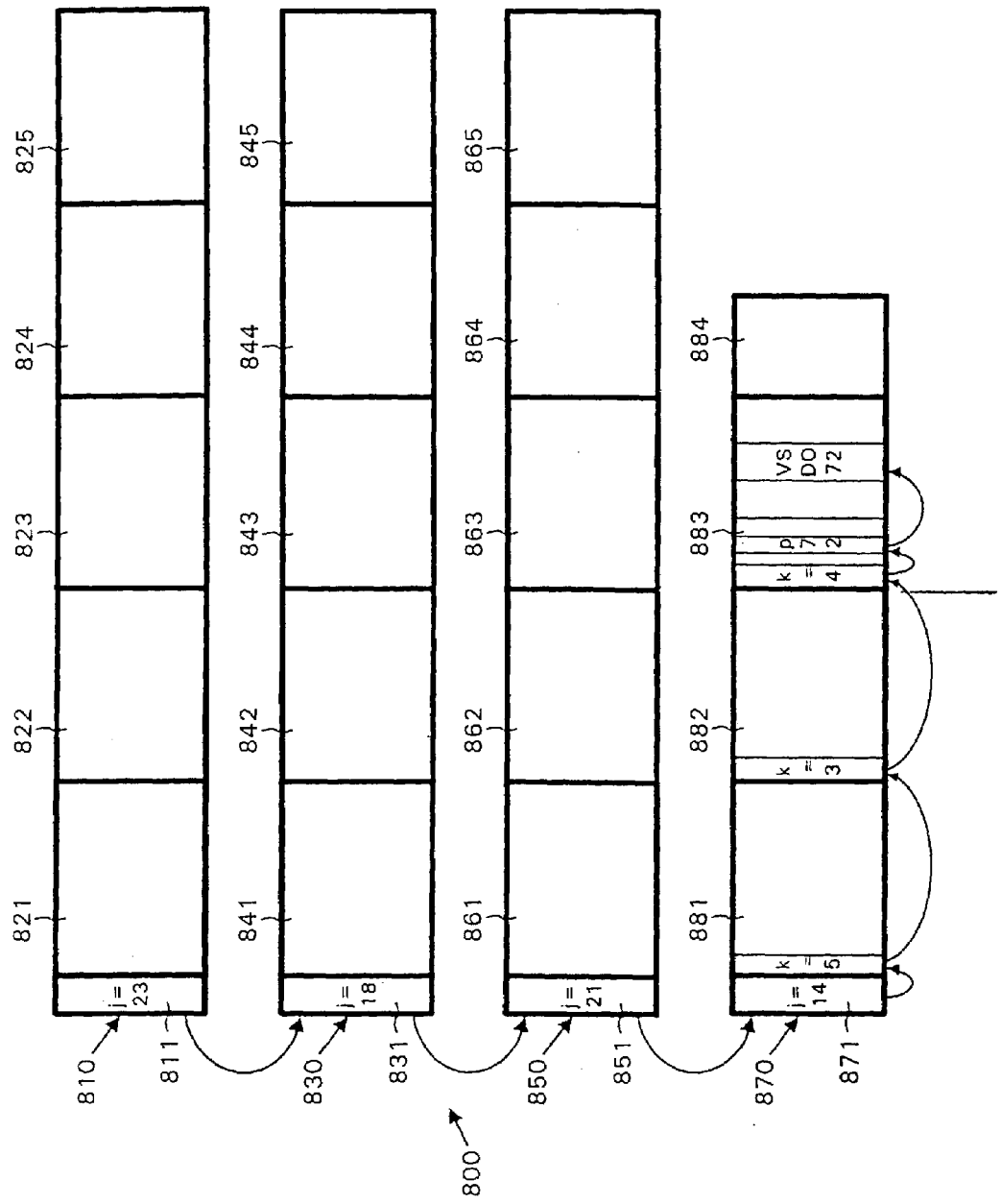
FIG. 21 is a block diagram showing the accessing of a variable-size data object within the hierarchically organized data structure of FIG. 19.

FIG. 21 shows the accessing of a VSDO within the hierarchically organized data structure 800 of FIG. 19. Packet 883 of metapacket 870 contains VSDO 72, which is the VSDO to be accessed in FIG. 21.

The access operation begins with consideration of metapacket 810.

The value j 811 in the metapacket header of metapacket 810 is 23. Because this value j 811 is less than 72 (the number of the object to be accessed), the access operation continues with metapacket 830.

The value j 831 of metapacket 830 is 18. The cumulative value of the metapacket headers 811 and 831 is now 41. Because this cumulative value is less than 72, the access operation continues with metapacket 850.

The value j 851 of metapacket 850 is 21. The cumulative value of the metapacket headers 811, 831, and 851 is now 62. Because this cumulative value is less than 72, the access operation continues with metapacket 870.

The value j 871 of metapacket 870 is 14. The cumulative value of the metapacket headers 811, 831, 851, and 871 is now 76. Because this cumulative value is greater than 72, metapacket 870 contains a reference for VSDO 72. VSDO 72 is accessed from within metapacket 870 through, for example, the above-described access technique 600 applied to the packets of metapacket 870.

As shown in this example, VSDO 72 is efficiently retrieved without processing the VSDOs, references, or reference count fields of packets within the preceding metapackets of the hierarchically organized data structure. The data structure 800 facilitates selective, rapid access to portions of a large data stream, even when the selectively accessed portions of the data stream are variable-size. Thus, for example, the data structure with VSDOs allows efficient, rapid, selective access even for variable-length, compressed information. Further, if a particular VSDO in an objects field is corrupted or otherwise lost, access to subsequent VSDOs is not necessarily prevented.

Data Structures Adjoining the Exemplary Data Structure

In one embodiment of the present invention, a composite data structure includes a base field and an enhancement field.

The enhancement field is implemented with a data structure with VSDOs, such as one described above.

In one use, the composite data structure stores information for a light field image. The base field stores data that is regularly accessed when a particular light field image is considered. The enhancement field stores data that is selectively and variably accessed. For example, compressed light field image information in the base field can be unconditionally decompressed while compressed light field image information in the enhancement field is selectively and conditionally accessed and decompressed. By storing data that is regularly accessed apart from data that is selectively and variably accessed, overall access speed and efficiency are improved. To further improve access speed and efficiency, the composite data structure can include flag values that indicate the presence or absence of enhancement field information. Various composite data structures are described in detail below.

IV. Using the Exemplary Data Structures in Light Field Operations

In one use, the exemplary data structures store information for a light field image. More specifically, a data structure with VSDOs stores enhancement layer information for a light field image that has been separated into base layer information and enhancement layer information.

A light field image can be separated into base layer information and enhancement layer information. Base layer information provides a low granularity version of the light field image, while enhancement layer information refines that low granularity version. Base layer and enhancement layer information are different for prediction light field images and reference light field images. Either type of light field information can be compressed to reduce representation at some cost to information quality and ease of manipulating the information.

To simplify presentation of the principles and techniques of light field image separation and coding, various actions are described below as performed by a compression unit or decompression unit. These units can be implemented as hardware or software codecs, for example. In general, the compression unit and decompression unit can be any functional operator or combination of functional operators in a computer system, and are not limited to any particular software or hardware implementation.

Additional detail about various aspects of separation, compression and decompression of light fields can be found in Shum et al., "Techniques for Spatial Displacement Estimation and Multi-Resolution Operations on Light Fields," U.S. patent application Ser. No. 09/471,678, filed Dec. 23, 1999, now U.S. Pat. No. 6,476,805, issued Nov. 5, 2002, and herein incorporated by reference.

Base Layer and Enhancement Layer Information for a Reference Light Field Image

For a reference light field image, base layer information generally includes a low-resolution version of the light field image. Enhancement layer information includes higher resolution refinements to the low-resolution version. For example, a reference light field image can be subband coded into multiple subbands. A subband includes graphical information for the original light field image within a specified frequency range. In general, a light field image can be separated into an arbitrary number of subbands. Alternatively, other multi-resolution intra-image coding schemes can be used on a reference light field image.

Separating a light field image into multiple subbands facilitates selective resolution operations. For example, low resolution, high significance subbands can be compressed differently, stored differently, or accessed differently than higher resolution, lower significance subbands. Low frequency subbands for light field images contribute low-resolution components to rendered perspective views. On the other hand, higher frequency subbands contribute higher resolution components to rendered perspective views. During rapid rendering, a rendering unit can access only the low frequency subbands to simplify processing by sacrificing high resolution detail not appreciated by the human eye. During less rapid rendering, the rendering unit can provide the supplementary detail from higher resolution subbands. Alternatively, when memory, processing, transmission, or other capabilities of a computer system are temporarily or permanently limited, a rendering unit can sacrifice higher resolution detail as necessary.

Following subband coding, the storage requirements for the subbands are comparable to the storage requirements for the original light field image. After subband coding, however, light field information is more easily compressed efficiently. The highest energy components of the original light field image are in the low frequency subbands. The compression unit compresses the low frequency subbands so as to largely preserve quality by organizing lower frequency subbands into wavelet blocks, zero-tree coding the wavelet blocks, and quantizing and entropy coding the zero-tree coded blocks. The higher frequency subbands store lower energy information. The compression unit transform codes, quantizes, and entropy codes higher frequency subbands. Alternatively, the compression unit applies different compression techniques.

Data Structure For Storing Reference Light Field Image Information

Figure 22:
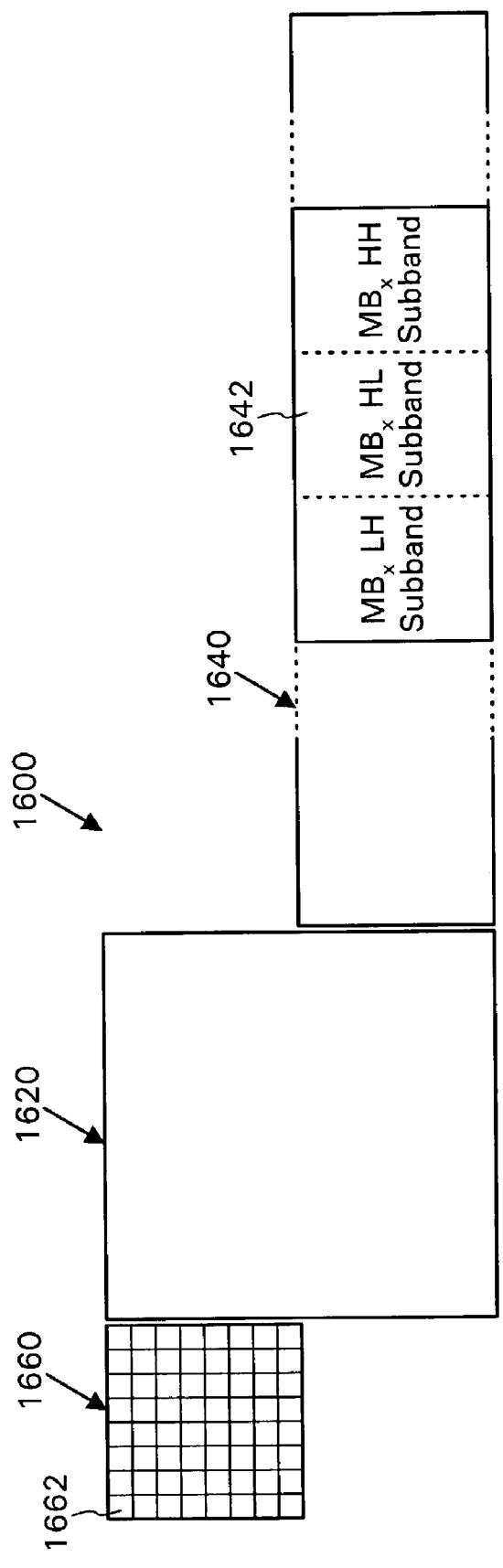
FIG. 22 is a block diagram of a data structure with a base field and an enhancement field, the data structure storing information for a reference light field image.

The compression unit can store the resulting subband information in different fields and sub-fields of a data structure 1600 such as that shown in FIG. 22. Data structure 1600 includes a base field 1620 and an enhancement field 1640. The enhancement field 1640 is implemented using a data structure with VSDOs, such as one of those described above. The base field 1620 stores data representing the LL subband of the reference light field image. For an operation that involves the reference light field image stored in data structure 1600, a decompression unit accesses the LL subband information in the base field 1620 according to a regular pattern. For example, the decompression unit decodes the entire base field 1620 before decoding any information in the enhancement field 1640. The data structure then includes decoded LL subband information in the base field and compressed higher frequency subband information in the enhancement field.

The enhancement field 1640 stores in VSDOs compressed information for higher frequency subbands, e.g., LH, HL, and HH, of a reference light field image. The information stored in the enhancement field 1640 is less significant than the information stored in the base field 1620. Therefore, information in the enhancement field 1640 is selectively accessed as needed during light field operations, reducing the number of unnecessary access and decoding operations.

In FIG. 22, the enhancement field 1640 includes sub-fields for storing data about individual parts of the reference light field image. Each sub-field stores data representing the higher frequency subband values for a single MB. Sub-field 1642 contiguously stores LH, HL, and HH subband information for MB$_x$. This sub-field/MB organization facilitates selective access and decoding of higher resolution information for particular MBs of a reference light field image.

For some reference light field images, the higher frequency subbands lack significant information. For this reason, for a particular MB, the enhancement field 1640 can omit information for any or all of the higher frequency subbands. For example, if the subband coefficients for a subband for a MB are zero or fall below a predetermined significance threshold (MSE, energy, etc.), the enhancement field 1640 omits information for that subband for that MB.

Compression of the higher frequency subbands can further contribute to the variable length of the enhancement field. Using a data structure with VSDOs such as one described above, however, facilitates efficient selective access to sub-fields of the enhancement field 1640.

When a decompression unit seeks information for a particular MB, the decompression unit selectively accesses and decodes the information in the sub-field corresponding to the particular MB. The speed of this operation can be further improved when the enhancement field 1640 lacks information for some MBs. For example, when the enhancement field 1640 lacks higher frequency subband information for a particular MB, a flag value can indicate that absence. FIG. 22 shows an index 1660 of such flag values. The index 1660 of flag values indicates the presence or absences of information within the enhancement field 1640 for individual MBs. In FIG. 22, the index 1660 is 8×8, reflecting the organization of a 128×128 reference light field image subband into 16×16 macroblocks. A sub-field 1662 stores a flag value indicating the presence or absence of LH, HL, and HH subband information for a MB$_o$. By checking the flag values before attempting to access information, the decompression unit avoids unnecessary traversal of the enhancement field 1640.

Alternatively, instead of indicating the complete presence or absence of information for a particular MB, a flag value indicates the presence or absence of information for particular subbands, or indicates if the information stored in a sub-field fails a significance threshold (e.g., zero or low energy subband coefficients). The data structure 1600 can lack an array of flag values or have a different size array of flag values.

The above-described features of data structure 1600 can appear alone or in different combinations. The above-described features can be altered for differently configured reference light field images or to accommodate particular compression techniques. Moreover, although FIG. 22 depicts a data structure for storing a single reference light field image, such a data structure can be combined with other data structures of the same or different types to store multiple reference light field images, a mix of reference and other light field images, or a mix of reference light field images and other information.

Base Layer and Enhancement Layer Information for a Prediction Light Field Image

For a prediction light field image, base layer information generally includes rough spatial displacement estimates from one or more reference light field images. Enhancement layer information includes, for example, prediction residual information, displacement difference vectors, and selectors indicating which reference light field image to estimate displacement from. Alternatively, other inter-image coding schemes can be used on a prediction light field image.

Light field images from neighboring vantage points around an object or static scene often overlap to some extent, which creates inter-image spatial redundancy. Inter-image spatial redundancy can be reduced by estimating spatial displacement of a prediction light field image from one or more reference light field images. FIG. 7 shows a block diagram in which a spatial displacement estimate from a reference light field image is made for section of a prediction light field image.

A compression unit identifies plural sections within the prediction light field image, for example, using block-based methods. With reference to FIG. 7, the compression unit identifies a GMB 60 in prediction light field image 14. The upper left corner of GMB 60 starts at location (x,y) 50 in prediction light field image 14. Although the GMB 60 is a square block, various other types, shapes, dimensions, and configurations of prediction light field image sections are possible.

For each prediction light field image GMB, the compression unit determines a corresponding GMB predictor in one or more reference light field images. A corresponding GMB predictor is an area of a reference light field image or its processed version that approximates a prediction light field image GMB. In FIG. 7, GMB predictor 70 approximates GMB 60.

After the compression unit determines a corresponding GMB predictor in a reference light field image, the compression unit determines a displacement vector ["DV"]. A DV indicates a spatial transformation from an initial position in the reference light field image to the corresponding GMB predictor. The initial position in the reference light field image corresponds to the position of the prediction GMB within the prediction light field image. Although FIG. 7 shows a two-dimensional spatial translation, various other types of transformations are possible.

When a compression unit works with multiple reference light field images, the compression unit can represent a prediction light field image in terms of displacement from one or more of the reference light field images. For example, in single predictor mode, the compression unit determines which corresponding GMB predictor most closely approximates a prediction light field image GMB. The DV for that corresponding GMB predictor is used to represent each MB of the prediction light field image GMB. In multi-predictor mode, in contrast, DVs from different reference light field images can be used to estimate spatial displacement for different MBs within a prediction light field image GMB.

For a prediction light field image GMB, a GMB DV indicates a spatial transformation for an entire GMB. As a result, for any one MB of the GMB, actual spatial displacement may deviate from the spatial displacement estimated for the GMB as a whole. On the other hand, MBs within a GMB often correlate in spatial displacement. For these reasons, the compression unit can estimate spatial displacement in a hierarchical manner. After determining a GMB DV, the compression unit determines displacement difference vectors ["DDVs"] for individual constituent MBs of the GMB. Alternatively, the compression unit determines DDVs for individual luminance blocks within MBs of a GMB. By adding a DDV to an appropriate GMB DV (which can vary by MB in multi-predictor mode), spatial displacement is estimated for a MB or block. Alternatively, hierarchical spatial displacement estimation can be implemented at other levels.

Frequently, spatial displacement estimation imperfectly approximates a prediction light field image. A compression unit can calculate residuals to ameliorate these imperfections. For example, to calculate a residual for a MB, the compression unit determines the difference between the original MB and the MB predicted by spatial displacement estimation. Residual values are typically compressed by some combination of lossy and lossless compression. Insignificant residual values can be discarded.

Data Structure for Storing Prediction Light Field Image Information

Figure 23:
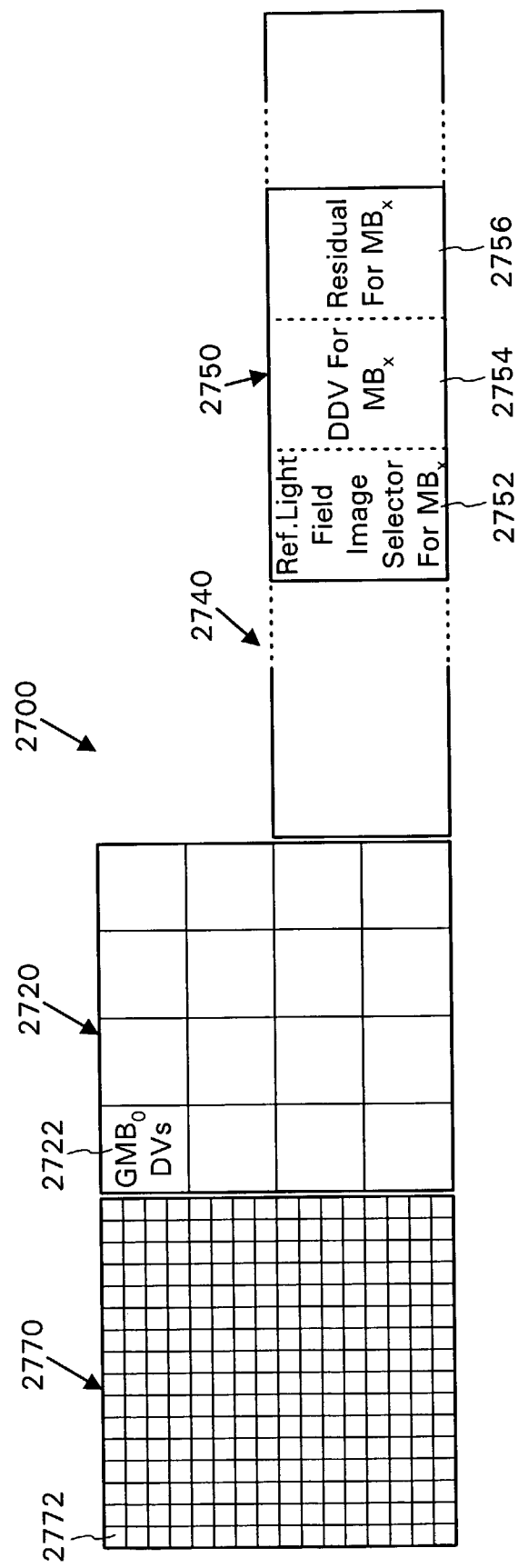
FIG. 23 is a block diagram of a data structure with a base field and an enhancement field, the data structure storing information for a prediction light field image.

The compression unit can store prediction light field image 25 components (DVs, DDVs, residuals, etc.) and related information in fields and sub-fields of a data structure 2700 such as that shown in FIG. 23. Data structure 2700 includes a base field 2720 and an enhancement field 2740. The enhancement field 2740 is implemented with a data structure with VSDOs, such as one of those described above. Data structure 2700 stores information in a way that facilitates spatial displacement estimation at selective quality levels.

The base field 2720 stores data representing DVs from reference light field images for prediction light field image GMBs. For an operation that involves the prediction light field image stored in data structure 2700, a decompression unit accesses the GMB DV information stored in base field 2720 according to a regular pattern. For example, the decompression unit decodes the entire base field 2720 before decoding any information in the enhancement field 2740. The data structure then includes the decoded GMB DVs in the base field and other information for the prediction light field image in the enhancement field.

In FIG. 23, the base field 2720 includes 16 sub-fields, corresponding to 16 GMBs of a prediction light field image. Alternatively, the base field 2720 includes a different number of sub-fields to correspond to a different number or type of prediction light field image sections. Each sub-field stores one or more DVs for a GMB of the prediction light field image. The GMB DVs can be uncompressed or compressed by a technique such as differential coding.

The enhancement field 2740 stores in VSDOs information for selecting a GMB DV or refining the prediction light field image as approximated using the base field 2720 information. The information stored in the enhancement field 2740 is less significant than the information stored in the base field 2720. Therefore, information in the enhancement field 2740 is selectively accessed as needed during light field operations, reducing the number of unnecessary decoding operations.

In FIG. 23, the enhancement field 2740 includes sub-fields for storing data about individual parts of the prediction light field image. Sub-field 2750 contiguously stores data pertaining to a prediction light field image $MB_x$. This data includes one or more multi-predictor mode reference light field image/GMB DV selectors 2752, one or more DDVs 2754, and/or a residual 2756. This sub-field/MB organization facilitates selective access and decoding of information for particular MBs of a prediction light field image.

Alternatively, a sub-field 2750 can store data pertaining to another part (e.g., GMB, section) of a prediction light field image. This data can include, for example, a DV selection or residual.

Depending on the compression scheme used and the contents of a prediction light field image, sub-fields for some prediction light field image MBs can be omitted from the enhancement field 2740. Compression of data in sub-fields can further contribute to the variable length of the enhancement field 2740. Using a data structure with VSDOs such as one described above, however, facilitates efficient selective access to sub-fields of the enhancement field 2740.

In FIG. 23, the data structure 2700 stores a prediction light field image that has been compressed under multi-predictor mode. For a particular prediction light field image MB, multiple reference light field images can provide GMB DVs. Sub-field 2722 stores a GMB DV from each of the reference light field images. A sub-field 2752 stores a selector for a particular $MB_x$ (or for each block k of $MB_x$) that indicates which reference light field image/GMB DV to use for spatial displacement estimation for $MB_x$.

In FIG. 23, the data structure 2700 stores a prediction light field image that has been compressed using hierarchical spatial displacement estimation. For a MB within a GMB, a DDV refines spatial displacement estimation. A sub-field 2754 stores a DDV for a particular $MB_x$ (or for each block k of $MB_x$) of the GMB.

In FIG. 23, the data structure 2700 stores a prediction light field image for which a compression unit has calculated residuals. A sub-field 2756 stores a residual that corrects estimation errors for a particular MBs.

If a prediction light field image includes MBs that are intra-coded (e.g., due to-inadequate spatial displacement estimation), the sub-field 2756 can store information for those intra-coded MBs.

When a decompression unit seeks information for a particular MB, the decompression unit selectively accesses and decodes information in the sub-field corresponding to the particular MB. The speed of this operation can be further improved when the enhancement field lacks information for some MBs. FIG. 23 shows an index 2770 of flag values. The index 2770 of flag values indicates the presence or absence of refinement information within the enhancement field 2740 for individual MBs. In FIG. 23, the index 2770 is 16×16, reflecting the organization of a 256×256 prediction light field image into 16×6 macroblocks. A sub-field 2772 stores a flag value indicating the presence or absence of refinement information in the enhancement field 2740 for a $MB_o$ within $GMB_o$. By checking the flag values before attempting to access information, the decompression unit avoids unnecessary traversal of the enhancement field 2740.

Alternatively, instead of indicating the complete presence or absence of information for a particular MB, a flag value indicates the presence or absence of a particular kind of information, e.g., MB residual, intra-coded MB, or DDV. The data structure 2700 can lack an array of flag values or have a different size array of flag values.

FIG. 23 shows a data structure 2700 storing a prediction light field image compressed in multi-predictor mode with hierarchical spatial displacement estimation, residual calculation, and flag array utilization. The above-described features of data structure 2700, however, can appear alone or in different combinations. The above-described features can be altered for differently configured prediction light field images or to accommodate particular compression techniques. Moreover, although FIG. 23 depicts a data structure for storing a single prediction light field image, such a data structure can be combined with other data structures of the same or different types to store multiple prediction light field images, a mix of prediction and other light field images, or a mix of prediction light field images and other information.

Accessing and Decompressing Light Field Information

During rendering and other light field operations, known light field images provide information for pixels of a novel perspective light field image. Depending on the perspective, different light field images and different parts of the different light field images are retrieved. When rendering a novel perspective light field image, much of the information for the known light field is not considered. If the light field is compressed, decompression of light field information that is not used potentially wastes resources. Moreover, although random access facilitates rendering, loading entire decompressed light fields into random access memory wastes memory and processor resources. Thus, to improve the efficiency of light field operations, using one of the above-described data structures with VSDOs light field information can be selectively accessed and decompressed.

The complexity of certain decompression and rendering operations can be further reduced when quality loss is acceptable or necessary. In such situations, accessing and decompressing non-essential light field information stretches resources. As described above, light field information can be compressed to a multi-resolution representation of some granularity. Selective and efficient access to enhancement layer information for a light field improves the speed of operations. Selective decompression of compressed enhancement layer information reduces memory and processor requirements for light field operations.

For example, a data structure can store a multi-resolution representation of a light field image and allow efficient access to information of varying quality levels. First, a decompression unit decompresses low frequency component layer information for reference light field images and/or rough spatial displacement estimation information for prediction light field images. For a rendering operation, a traced light ray for a novel perspective light field image pixel intersects the light field. From the intersection point, one or more match points are determined in the light field. For a match point, the decompression unit selectively decompresses enhancement layer information. From the decompressed information, a reproduction value for the novel perspective light field image pixel is calculated. Decompression of enhancement information for a match point can be conditionally bypassed based upon the presence or absence of enhancement layer information, or based upon some computer system, network, or other constraint.

Although the above techniques refer to selective decompression of information for a match point, by default, the decompression unit selectively decompresses enhancement layer information for a match area that includes the match point. For example, a decompression unit decompresses enhancement layer information for a MB that includes a match pixel. This simplifies the task of indexing information for selective enhancement decompression.

Figure 24:
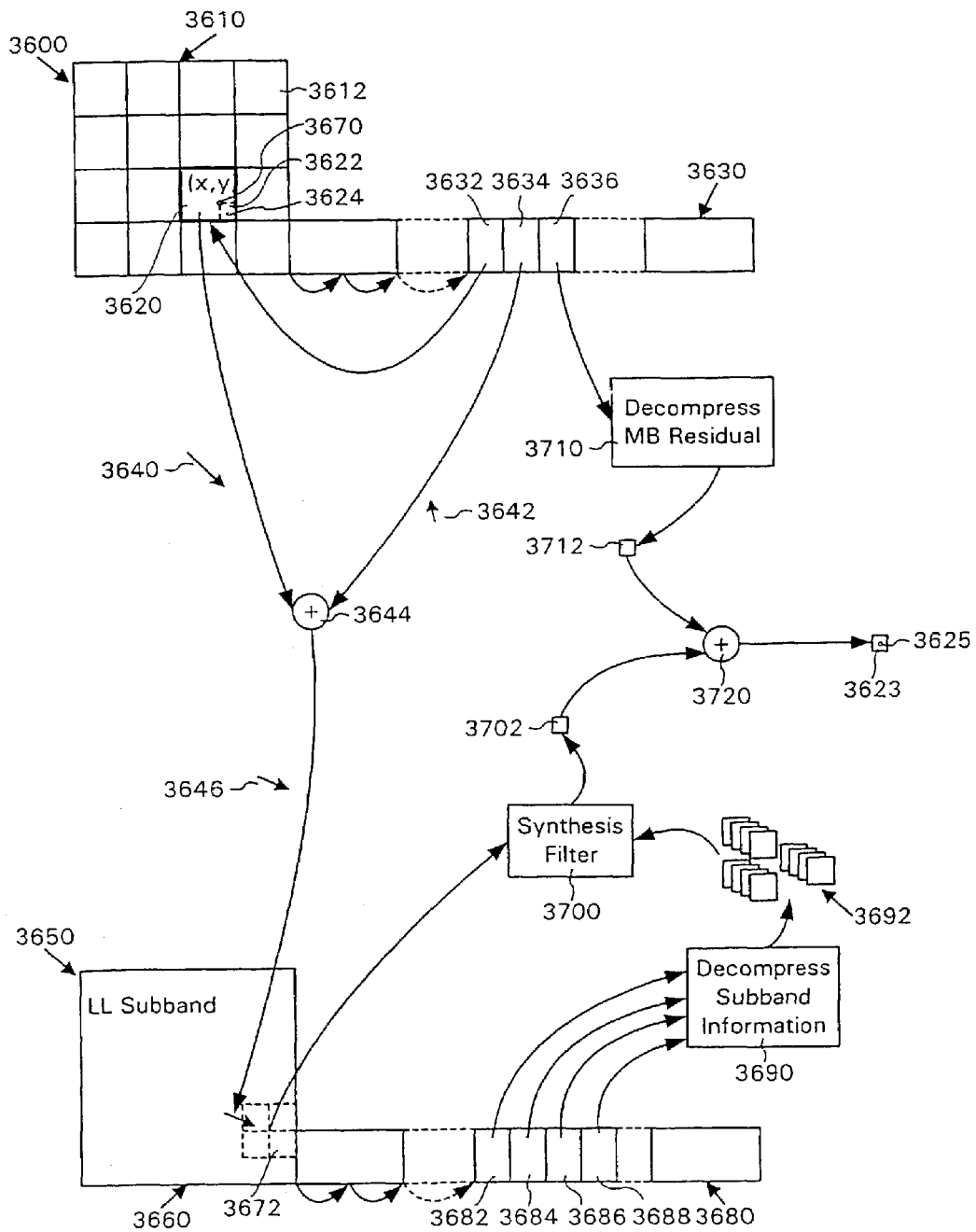
FIG. 24 is a diagram showing selective enhancement decompression of light field information stored in data structures with variable-size data objects.

Selective Access to and Decompression of Enhancement Layer Information Using a Data Structure with VSDOs A data structure with VSDOs can provide efficient, selective access to enhancement layer information. The enhancement layer information can be compressed, in which case, it is decompressed following access. FIGS. 8–13, 17, 19, and 21 show exemplary data structures with VSDOs. FIGS. 22 and 23 show exemplary data structures with VSDOs storing information for a reference light field image and a prediction light field image, respectively. FIG. 24 shows data structures with VSDOs facilitating selective enhancement access and decompression.

FIG. 24 shows a data structure 3600 with VSDOs that stores a 256×256 prediction light field image that includes 16×16 macroblocks. Data structure 3600 includes a base field 3610 and an enhancement field 3630. The base field 3610 stores GMB DVs. In FIG. 24, the base field is decompressed. A sub-field 3612 stores one or more DVs for $GMB_3$. The enhancement field 3630 stores in VSDOs spatial displacement estimation refinement information for MBs. The VSDOs are traversed as described above. A sub-field 3632 stores a GMB DV selector for $MB_x$, a sub-field 3634 stores one or more DDVs for $MB_x$, and a sub-field 3636 stores a residual for $MB_x$. The residual for $MB_x$ can be compressed. A light field can include one or more data structures 3600, each storing a prediction light field image.

FIG. 24 also shows a data structure 3650 with VSDOs that stores a 256×256 reference light field image. Data structure 3650 includes a base field 3660 and an enhancement field 3680. The base field 3660 stores LL subband information for a 128×128 LL subband that includes 16×16 macroblocks. In FIG. 24, the base field is decompressed. The enhancement field 3680 stores in VSDOs LH, HL, and HH subband information for MBs. The VSDOs are traversed as-described above. In FIG. 24, the information in the enhancement field 3680 is compressed. For example, sub-fields 3682, 3684, 3686, and 3688 store compressed LH, HL, and HH subband information for each of the four MBs of the initial predictor 3672, respectively. A light field can include one or more data structures 3650, each storing a reference light field image.

FIG. 24 shows selective decompression of enhancement layer information stored in data structures with VSDOs and reconstruction of a value for a match point 3624. The prediction light field image stored in data structure 3600 includes the match point 3624. The prediction light field image was compressed using hierarchical, multi-predictor spatial displacement estimation and has residuals. Information for match points is organized by 16×16 MB and 64×64 GMB.

A $MB_x$ 3622 of GMB 3620 includes the match point 3624. Due to the multi-predictor mode compression, a sub-field 3632 for $MB_x$ 3622 holds a GMB DV selector. The GMB DV selector for $MB_x$ 3622 is selectively accessed in the enhancement field 3630. From the base field 3610, a decompressed GMB DV 3640 for the selected reference light field image is used to estimate spatial displacement for $MB_x$ 3622. Alternatively, sub-field 3632 holds a GMB DV selector for each of one or more blocks of $MB_x$ 3622.

Due to the hierarchical spatial displacement estimation, a sub-field 3634 stores one or more DDVs for the $MB_x$ 3622. Any DDVs for the $MB_x$ 3622 are selectively accessed in the enhancement field 3630. In FIG. 24, a single DDV 3642 refines spatial displacement estimation for $MB_x$ 3622. Alternatively, multiple DDVs refine spatial displacement estimation for blocks of a $MB_x$ 3622. The GMB DV 3640 and the DDV 3642 form (3644) a resultant DV 3646 for $MB_x$ 3622.

In the base field 3610, a location 3670 indicates a predetermined corner of the MB 3622 in the prediction light field image. Applying the resultant DV 3646 to the location 3610 yields the predictor in the reference light field image. To obtain the predictor, the corresponding information in the LL, LH, HL, and HH subbands are decoded. In FIG. 24, the initial predictor 3672 in the LL subband consists of 4×16×16 MBs. The actual number of MBs in the initial predictor 3672 and their positions can be determined from the resultant DV 3646, the length of the subband filters, and the size of the MBs, for example, by scaling the DVs and taking into account the length of the subband filters.

LH, HL, and HH subband information for the initial predictor 3672 supplements the LL subband information. LH, HL, and HH subband information for the initial predictor 3672 is selectively accessed in the sub-fields 3682, 3684, 3686, and 3688 of the enhancement field 3680. Each of the sub-fields 3682, 3684, 3686, and 3688 stores compressed LH, HL, and HH subband information for one of the MBs of the initial predictor 3672 for MB 3622. When the selectively accessed subband information is compressed, a decompression unit 3690 decompresses it.

A synthesis filter 3700 combines the LL subband information for the initial predictor 3672 with any corresponding LH, HL, and HH subband information. The output of synthesis filtering includes a 16×16 final predictor 3702 for the MB 3622 of the prediction light field image.

A sub-field 3636 stores a residual 3712 for $MB_x$ 3622. As shown in FIG. 24, when the residual is compressed, a decompression unit 3710 decompresses the residual 3712 for $MB_x$ 3622. Combining the residual 3712 and the final predictor 3702 forms (3720) a 16×16 reconstructed version 3623 of $MB_x$ 3622. The reconstructed $MB_x$ 3623 includes a reconstructed value 3625 for the match point 3624.

According to the illustrative embodiment, due to the overlapping of the subband filters, the number of pixels that can be computed is less than 16 (16×16) MBs. For example, if a single pixel is needed, some of these computations can be saved by computing only the required pixel. (As with filtering, one output is computed from several input samples.)

When a reference light field image includes the match point, a reconstructed version of the MB that includes the match point is created. For example, the base field 3660 includes decompressed LL subband information for the MB. LL, LH, and HH subband information in sub-fields of the enhancement field 3680 supplements the LL subband information for the MB. This LH, HL, and HH subband information is selectively accessed. When the selectively accessed subband information is compressed, a decompression unit 3690 decompresses it. Synthesis filter 3700 combines the LL, LH, HL, and HH subband information to produce a reconstructed version of the MB that includes the match point.

FIG. 24 shows one use of the exemplary data structures with VSDOs with light field information. In other uses, a match point value is reconstructed from a prediction light field image compressed in single-predictor mode, without hierarchical spatial displacement estimation, and/or without residuals. Enhancement layer information for an area that includes a match point can be selectively accessed at some level of organization besides GMB/MB. Moreover, values can be reconstructed for multiple match points for a novel perspective light field image pixel. In general, enhancement layer information can be compressed to some other frequency divisions and/or spatial displacement estimation levels. As described above, selective access and/or decompression of enhancement information can be conditionally bypassed based upon a flag value for a match point or match area, or based upon a processor, memory, transmission, or other system constraint.

While the above techniques and data structures have been described with reference to light field information, they are applicable to other types of graphical and non-graphical information.

Having described and illustrated the principles of our invention with reference to an illustrative embodiment, it will be recognized that the illustrative embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrative embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

The invention claimed is:

1. A method for filling a data structure with a plurality of variable-size data objects, the data structure comprising one or more packets, wherein each packet of the one or more packets comprises a reference count k, k references to variable-size data objects, and at least parts of one or more of the plurality of variable-size data objects, the method comprising for each of the plurality of variable-size data objects, iteratively repeating:
   designating the variable-size data object;
   tracking readiness to write one or more designated variable-size data objects to a to-be-filled packet of the one or more packets;
   when ready to write the one or more designated variable-size data objects to the to-be-filled packet,
      writing the reference count k to the to-be-filled packet, for the one or more designated variable-size data objects, writing the k references and at least part of each of the one or more designated variable-size data objects to the to-be-filled packet, and
      preparing to fill a subsequent packet of the one or more packets, wherein the preparing comprises:
         adjusting a cumulative size value, wherein the cumulative size value measures cumulative size of to-be-written designated variable-size data objects and cumulative size of references to the to-be-written designated variable-size data objects,
         initializing a total designated variable-size data objects count; and
         selecting the subsequent packet as the to-be-filled packet.

2. The method of claim 1 wherein the tracking readiness comprises:
   incrementing the total designated variabic-size data objects count; and
   updating the cumulative size value.

3. The method of claim 1 further comprising determining when ready to write to the to-be-filled packet by:
   comparing the cumulative size value to a packet size threshold value, wherein the packet size threshold indicates available space in the to-be-filled packet; and
   if the cumulative size value is greater than or equal to the packet size threshold, performing the writing acts.

4. The method of claim 1 wherein the writing the k references and the at least part of each of the one or more designated variable-size data objects to the to-be-filled packet comprises:
   reserving space for the k references; and
   for each of the one or more designated variable-size data objects,
      writing a reference of the k references to the to-be-filled packet; and
      writing the variable-size data object to the to-be-filled packet to the extent space allows in the to-be-filled packet.

5. A computer-readable medium storing computer-executable instructions for causing a computer system programmed thereby to perform a method of filling a data structure with a plurality of variable-size data objects, the data structure comprising one or more packets, wherein each packet of the one or more packets comprises a reference count k, k references to variable-size data objects, and at least parts of one or more of the plurality of variable-size data objects, the method comprising, for each of the plurality of variable-size data objects, iteratively repeating:
 designating the variable-size data object;
 tracking readiness to write one or more designated variable-size data objects to a to-be-filled packet of the one or more packets;
 when ready to write the one or more designated variable-size data objects to the to-be-filled packet,
  writing the reference count k to the to-be-filled packet,
  for the one or more designated variable-size data objects, writing the k references and at least part of each of the one or more designated variable-size data objects to the to-be-filled packet, and
  preparing to fill a subsequent packet of the one or more packets, wherein the preparing comprises:
   adjusting a cumulative size value, wherein the cumulative size value measures cumulative size of to-be-written designated variable-size data objects and cumulative size of references to the to-be-written designated variable-size data objects,
   initializing a total designated variable-size data objects count; and
   selecting the subsequent packet as the to-be-filled packet.

6. The computer-readable medium of claim 5 wherein the tracking readiness comprises:
 incrementing the total designated variable-size data objects count; and
 updating the cumulative size value.

7. The computer-readable medium of claim 5 wherein the method further comprises determining when ready to write to the to-be-filled packet by:
 comparing the cumulative size value to a packet size threshold value, wherein the packet size threshold indicates available space in the to-be-filled packet; and
 if the cumulative size value is greater than or equal to the packet size threshold, performing the writing acts.

8. The computer-readable medium of claim 5 wherein the writing the k references and the at least part of each of the one or more designated variable-size data objects to the to-be-filled packet comprises:
 reserving space for the k references; and
 for each of the one or more designated variable-size data objects,
  writing a reference of the k references to the to-be-filled packet; and
  writing the variable-size data object to the to-be-filled packet to the extent space allows in the to-be-filled packet.

9. A system for filling a data structure with a plurality of variable-size data objects, the data structure comprising one or more packets, wherein each packet of the one or more packets comprises a reference count k, k references to variable-size data objects, and at least pans of one or more of the plurality of variable-size data objects, the system including one or more modules for iteratively repeating, for each of the plurality of variable-size data objects:
 designating the variable-size data object;
 tracking readiness to write one or more designated variable-size data objects to a to-be-filled packet of the one or more packets; and
 when ready to write the one or more designated variable-size data objects to the to-be-filled packet,
  writing the reference count k to the to-be-filled packet,
  for the one or more designated variable-size data objects, writing the k references and at least part of each of the one or more designated variable-size data objects to the to-be-filled packet, and
  preparing to fill a subsequent packet of the one or more packets, wherein the preparing comprises:
   adjusting a cumulative size value, wherein the cumulative size value measures cumulative size of to-be-written designated variable-size data objects and cumulative size of references to the to-be-written designated variable-size data objects,
   initializing a total designated variable-size data objects count; and
   selecting the subsequent nacket as the to-be-filled packet.

10. The system of claim 9 wherein the tracking readiness comprises:
 incrementing the total designated variable-size data objects count; and
 updating the cumulative size value.

11. The system of claim 9 wherein the one or more modules are also for determining when ready to write to the to-be-filled packet by:
 comparing the cumulative size value to a packet size threshold value, wherein the packet size threshold indicates available space in the to-be-filled packet; and
 if the cumulative size value is greater than or equal to the packet size threshold, performing the writing acts.

12. The system of claim 9 wherein the writing the k references and the at least part of each of the one or more designated variable-size data objects to the to-be-filled packet comprises:
 reserving space for the k references; and
 for each of the one or more designated variable-size data objects,
  writing a reference of the k references to the to-be-filled packet; and
  writing the variable-size data object to the to-be-filled packet to the extent space allows in the to-be-filled packet.

* * * * *